United States Patent
Furukawa

(10) Patent No.: US 8,015,405 B2
(45) Date of Patent: Sep. 6, 2011

(54) PROVING APPARATUS AND VERIFICATION APPARATUS APPLIED TO DENIABLE ZERO-KNOWLEDGE INTERACTIVE PROOF

(75) Inventor: Jun Furukawa, Tokyo (JP)

(73) Assignee: NEC Corporation, Tokyo (JP)

( * ) Notice: Subject to any disclaimer, the term of this patent is extended or adjusted under 35 U.S.C. 154(b) by 752 days.

(21) Appl. No.: 12/063,448

(22) PCT Filed: Aug. 8, 2006

(86) PCT No.: PCT/JP2006/315994
§ 371 (c)(1),
(2), (4) Date: Feb. 11, 2008

(87) PCT Pub. No.: WO2007/018311
PCT Pub. Date: Feb. 15, 2007

(65) Prior Publication Data
US 2009/0287926 A1    Nov. 19, 2009

(30) Foreign Application Priority Data
Aug. 11, 2005    (JP) .................................. 2005-233636

(51) Int. Cl.
H04L 9/32    (2006.01)
(52) U.S. Cl. ........................................ 713/168; 713/176
(58) Field of Classification Search .................. 713/168, 713/169, 181, 182, 180, 176; 705/50, 72, 705/75; 380/28–30
See application file for complete search history.

(56) References Cited

U.S. PATENT DOCUMENTS

| 5,581,615 A * | 12/1996 | Stern ............................. 713/180 |
| 6,011,848 A * | 1/2000 | Kanda et al. .................. 713/170 |
| 6,148,404 A * | 11/2000 | Yatsukawa ........................ 726/2 |
| 6,282,295 B1 * | 8/2001 | Young et al. ................... 380/286 |
| 6,389,536 B1 * | 5/2002 | Nakatsuyama ................ 713/165 |
| 7,003,541 B2 * | 2/2006 | Furukawa et al. ............. 708/512 |
| 7,490,070 B2 * | 2/2009 | Brickell .......................... 705/75 |
| 7,536,551 B2 * | 5/2009 | Furukawa ...................... 713/168 |
| 2005/0058288 A1 * | 3/2005 | Sundaram et al. ............ 380/258 |

OTHER PUBLICATIONS

Oded Goldreich, "Foundations Ofcryptography, Basic Tools", Cambridge University Press, 2001, p. 206-207.
"Amos Fial Adi Shamir", How to Prove Yourself: Practical Solutions to Identificaiton and Problems", "Crypto 1986. p. 186-194.
$23^{RD}$ Annual International Cryptology Conference Santa Barbara, California, USA, Aug. 2003, Proceedings, On Deniability in the Common Reference String and Random Oracle Model, p. 3316-337.

* cited by examiner

Primary Examiner — Nirav B Patel
(74) Attorney, Agent, or Firm — Young & Thompson

(57) ABSTRACT

The present invention enables deniable zero-knowledge interactive proof to be performed with low amounts of communications and calculations by utilizing a method of a special honest verifier zero-knowledge interactive proof when such method is given. The verification apparatus generates a commitment of a challenge value with respect to a predetermined relationship and transmits the commitment of the challenge value to the proving apparatus, which determines whether or not a required relationship using the commitment of the challenge value holds, and stops its operation if such relationship does not hold. The proving apparatus causes the proof commitment generation apparatus to generate a proof commitment and transmits the proof commitment to the verification apparatus, which transmits a challenge value and a random number to the proving apparatus. The ladder transmits a response to the verification apparatus which determines acceptance or non-acceptance of the proof through communications with the interactive proof verification apparatus.

7 Claims, 6 Drawing Sheets

PROVING APPARATUS AND VERIFICATION APPARATUS APPLIED TO DENIABLE ZERO-KNOWLEDGE INTERACTIVE PROOF

TECHNICAL FIELD

The present invention relates to a proving apparatus and a verification apparatus that can be applied to deniable zero-knowledge interactive proof.

BACKGROUND ART

The deniable zero-knowledge interactive proof technique in a random oracle model is disclosed in some inventions, notable of which is Literature 1. The art of Literature 1 (hereinafter, "Related Art 1") will be described below.

FIG. 4 is an illustrative diagram which shows the configuration disclosed in Literature 1. In the drawings accompanying the present application, merging arrows indicate that all the information at the sources of these arrows is merged together and sent to the single destination of these arrows. A forked arrow indicates that all or part of the information at the source of this arrow is sent to the multiple respective destinations of this arrow.

A language proved by Related Art 1 is an NP-complete 3-graph coloring problem, where a "language" refers to a set of data. The reference that a language is a "3-graph coloring problem" means that a set of data is a set of 3-graph coloring problems. Proving that a "d" belongs to a language (e.g., a set of 3-graph coloring problems) is equivalent to proving that a "d" belongs to a set of 3-graph coloring problems. That Related Art 1 can prove this language with deniable zero-knowledge means that Related Art 1 can prove all languages belonging to NP with deniable zero-knowledge.

As a common input 101, the proving apparatus 103 and the verification apparatus 104, shown in FIG. 4, receive input of a directional graph $G_n=(V_G, E_G)$, where $V_G$ is a set of graph vertices, $E_G$ is a set of graph sides, and the graph G is expressed by both $V_G$ and $E_G$. The number of vertices (which is denoted as $|V_G|$) is expressed as $|V_G|=n$.

The proving apparatus 103 receive input of the colors of vertices $C=(c_1, c_2, \ldots, c_n)$ as an evidence 102. $i \in \{1, \ldots, n\}$ each is $c_i \in \{1, 2, 3\}$, which indicates the three colors, thereby expressing the different colors of vertices. C is colored so that, for all the sides, two vertices connected by a side are in different colors from each other.

The proving apparatus 103 proves to the verification apparatus 104 that the above-mentioned evidence C really exists with respect to G, by performing a deniable zero-knowledge interactive proof. Performing an "interactive proof" means the following. If C having the property described above does not exist with respect to G, then whatever false proving apparatus may be used, the verification apparatus (verification apparatus 104 in this example) would ultimately not output a signal which indicates that it will accept the proof, after the false proving apparatus and the verification apparatus (verification apparatus 104 in this example) communicate with each other and perform respective calculations. If G and C are inputted into the proving apparatus (proving apparatus 103 in this example) and the verification apparatus (verification apparatus 104 in this example), the verification apparatus (verification apparatus 104 in this example) outputs a signal which indicates that it will accept the proof.

Being a deniable zero-knowledge means the following. Whatever false verification apparatus may communicate with the proving apparatus (proving apparatus 103 in this example), outputs from this false verification apparatus always satisfy the property described below (property A), regardless of whatever data has been inputted into the false verification apparatus and even thought the false verification apparatus operates in polynomial time only; provided that the false verification apparatus can concurrently communicate with a plurality of proving apparatuses which have been given the same G and C. The property A is a property in which, if a simulation apparatus exists which can communicate with a false verification apparatus and which operates in polynomial time only, and if an input into the false verification apparatus is given to the simulation apparatus, the simulation apparatus can output data from which the output from the false verification apparatus and its distribution are unidentifiable even though the simulation apparatus is unable to communicate with the proving apparatus (proving apparatus 103 in this example). A concrete example of property A will be described below. This example assumes, as an example, that an arbitrary false verification apparatus outputs some data after communicating with the proving apparatus (proving apparatus 103 in this example). The data will be referred to as "data a" in the following description. The simulation apparatus also communicates with the false verification apparatus (during which the simulation apparatus behaves as a proving apparatus) and then outputs some data. The data will be referred to as "data b" in the following description. Whatever false verification apparatus may be used, the simulation apparatus can output the distribution of its output data, data a, as well as data b having an unidentifiable distribution (property A).

The reference that the distribution of data a and the distribution of data b are unidentifiable means the following. Suppose that the distribution A of certain data and the distribution B of another data are given. Data a is data which has been selected from the distribution A uniformly and randomly, while data b is data which has been selected from the distribution B uniformly and randomly. Whatever identification apparatus D (which outputs either 0 or 1) may be used, the distribution of data a and that of data b are unidentifiable if the probability that the identification apparatus D outputs 1 when a is inputted into the identification apparatus D is the same as the probability that the identification apparatus D outputs 1 when b is inputted into the identification apparatus D. The probability is obtained by selecting different pairs of a and b from the distributions A and B repeatedly.

Next, the operations of the proving apparatus 103 and the verification apparatus 104 shown in FIG. 4 will be described. While the following description shows an example in which a discrete logarithm problem is used, a general (probabilistic) one-way function can also be used. $G_q$ is a multiplicative group in which a discrete logarithm problem for an order q is difficult, and g is its generator. t is a safety variable. It suffices for t to have a value of 160 or higher. Hash (•) is a hash function and its output size is denoted as t bits.

Step 1: The verification apparatus 104 randomly selects $x \in Z/qZ$ and calculates $y=g^x$.

Step 2: The verification apparatus 104 selects $x'[i] \in Z/qZ$ with respect to $i=1, \ldots, t$ and sets $y'[i]=gx'[i]$.

Step 3: The verification apparatus 104 selects random numbers $r[1, i] \in \{0, 1\}^n$ and $r[2, i] \in \{0, 1\}^n$ with respect to $i=1, \ldots, t$. With respect to $i=1, \ldots, t$, the verification apparatus 104 generates hash values $c[1, i]=\text{Hash}(x'[i], r[1, i])$ and $c[2, i]=\text{Hash}(x'[i]+x, r[2, i])$ by communicating many times with an apparatus 105 which generates hash functions.

Step 4: The verification apparatus 104 calculates a t-bit hash value c using the following equation.

$$h=\text{Hash}(\{g, y, y'[i], c[1, i], c[2,i]\}i=1, \ldots, t)$$

If the i-th bit of h is 0, the verification apparatus 104 sets t[1, i]=x'[i] and t[2, i]=r[1, i] with respect to i=1, . . . , t. If the i-th bit of h is 1, the verification apparatus 104 sets t[1, i]=x'[i]+x and t [2, i]=r[2, i]).

Step 5: The verification apparatus 104 sends {g, y, y'[i], c[1, i], c[2, i], t[1, i], t[2, i]}=1, . . . , t) to the proving apparatus 103.

Step 6: The proving apparatus 103 calculates h'=Hash({g, y, y'[i], c[1, i], c[2, i]} i=1, . . . , t). By communicating with an apparatus 107 which calculates a hash function, the proving apparatus 103 verifies with respect to i=1, . . . , t that c[1, i]=Hash(t[1, i], t[2, i]) and $g^r$[1, i]=y'[i] if the i-th bit of h' is 0 and c[2, i]=Hash(t[1, i], t[2, i]) and $g^r$2, i]=y·y'[i] if the i-th bit of h' is 1.

Step 7: The proving apparatus 103 generates a non-interactive zero-knowledge proof in which a hash function 107 is used, in order to prove that it knows x in y=$g^x$ or knows C with respect to G. At this time, the proving apparatus 103 proves this in such a manner that which one of these it knows is not identifiable. The non-interactive zero-knowledge proof in Step 7 is generated according to, for example, the method described in Literature 3.

Step 8: The proving apparatus 103 sends the non-interactive zero-knowledge proof generated in Step 7 to the verification apparatus 104.

Step 9: The verification apparatus 104 verifies the non-interactive zero-knowledge proof sent from the proving apparatus 103. If the proof is correct, the verification apparatus 104 accepts it. Otherwise, the verification apparatus 104 outputs as a verification result 109 a signal which indicates non-acceptance of the proof.

Assuming that a hash function is a function which returns random data, Steps 1 to 5 collectively represent a non-interactive zero-knowledge proof by the verification apparatus 104 to prove that the verification apparatus 104 knows x. Whether or not the verification apparatus 104 knows x can be determined as follows.

The data sent from the proving apparatus 103 should be as described below with respect to h'=Hash({g, y, y'[i], c [1, i], c [2, i]} i=1, . . . , t).

That is, with respect to i=1, . . . , t, if the i-th bit of h' is 0, the equations c[1, i]=Hash(t[1, i], t[2, i]) and $g^r$[1, i]=y'[i] should hold true; if the i-th bit of h' is 1, the equations c[2, i]=Hash(t [1, i], t[2, i]) and $g^r$2, i]=y·y'[i] should hold true.

Such data can easily be generated as long as the value of h' has been predetermined. This kind of assumption is possible if the hash function is assumed to be a function which returns a random number, and therefore the data can be generated even though x is unknown. In this case, the proving apparatus 103 will not be able to obtain any knowledge from this data.

The fact that a proof as described above represents an interactive proof between the proving apparatus 103 and the verification apparatus 104 is clear from the following. In Step 7, the proving apparatus 103 proves to the verification apparatus 104 that, with respect to G, (1) it knows C, i.e., C exists with respect to G, or (2) it knows x. However, since no knowledge can be obtained from the data received in Step 5, the proving apparatus 103 is unable to obtain the discrete log of Gq and therefore z remains unknown to the proving apparatus 103. Thus, it is necessary to prove (1) above.

The fact that the interaction between the proving apparatus 103 and the verification apparatus 104 in the operation described above represents deniable zero-knowledge is clear from the following. In a random oracle model, when the verification apparatus 104 calculates hash values c[1, i]=Hash (x'[i], r[1, i]) and c[2, i]=Hash(x'[i]+x, r[2, i]), it must send both (x'[i], r[1, i]) and (x'[i]+x, r[2, i]) to the random oracle. If a simulation apparatus intercepts these values, it can easily obtain x by performing a simple calculation: (x'[i]+x)−x'[i]=x. Once the simulation apparatus gains knowledge of x, it can make a proof of (2) above (i.e., it knows x) in Step 7. This proof is not identifiable from a proof of (1) above (i.e., it knows C). This means that the simulation apparatus can generate data that is unidentifiable from the data generated by the proving apparatus 103.

In the operation above, a deniable zero-knowledge interactive proof between the proving apparatus 103 and the verification apparatus 104 consists of two rounds of communication. In other words, the proof only requires a total of two communications: one from the verification apparatus 104 to the proving apparatus 103 and the other from the proving apparatus 103 to the verification apparatus 104.

The special honest verifier zero-knowledge interactive proof technique is disclosed, for example, in Literature 2. A "special honest verifier" implies that data sent by a verifier (verification apparatus) to a prover (proving apparatus) is a random number. In a special honest verifier zero-knowledge interactive proof, three messages are used: a message aR, which is initially sent from the proving apparatus to the verification apparatus, a message eR, which is then sent from the verification apparatus to the proving apparatus, and a message zR, which is finally sent from the proving apparatus to the verification apparatus. A "proof commitment" is a message aR, which is initially sent to the verification apparatus. A "challenge value" is a message eR, which is then sent from the verification apparatus to the proving apparatus. A "response" is a message zR, which is finally sent from the proving apparatus to the verification apparatus.

The art of Literature 2 (hereinafter, "Related Art 2") will now be described below. FIGS. 5 and 6 are illustrative diagrams which show the configurations disclosed in Literature 2. In the description below, a relationship is denoted by R, a common input (common input 207 in FIG. 5 and FIG. 6) by X, and an evidence (evidence 208 in FIG. 6) by W. (X, W)∈R indicates that a common input X and an evidence W satisfy a relationship R.

The proof commitment generation apparatus 201 shown in FIG. 5 is an apparatus which generates a proof commitment using a function $A_R$. The response generation apparatus 202 is a function which generates a response using a function $Z_R$. The verification apparatus 203 is an apparatus which outputs a verification result using a function $V_R$. The simulation apparatus 204 shown in FIG. 6 is an apparatus which performs an operation of a function $S_R$. The evidence extraction apparatus 205 is an apparatus which extracts an evidence using a function $E_R$. The functions $A_R$, $Z_R$, $V_R$, $S_R$ and $E_R$ will be described later.

A 3-round special honest verifier zero-knowledge interactive proof with respect to the relationship R is denoted as SHVZKIP(R). This proof uses the function $A_R$ for generation of a proof commitment, the function $Z_R$ for generation of a response, the function $V_R$ for verification, the function $S_R$ for simulation and the function $E_R$ for extraction of an evidence. It satisfies the property described below, where $R_p$ and $R_S$ are random tapes:

(First Property)

Suppose that the challenge value eR (challenge value 212 in the diagram) is a random number 206. Also suppose that the proof commitment aR (proof commitment 209 in the diagram) and the response zR (response 210 in the diagram) are respectively expressed by the equations below:

$$aR = A_R(X, W, R_p)$$

$$zR = Z_R(X, W, R_p, e_R)$$

Then $V_R=V_R(X, a_p, e_R, z_R)=1$ holds true, where an output from $V_R$ is called a verification result 211.
(Second Property)

Suppose that the proof commitment $a_R$ (proof commitment 213 in the diagram), the first challenge value $e_R$ and the second challenge value $e'_R$ (pair of the first and second challenge values 214 in the diagram) and the first response $z_R$ and the second response $z'_R$ (pair of the first and second responses 215) satisfy the following equations:

$$V_R(X, a_R, e_R, z_R)=1$$

$$V_R(X, a_R, e'_R, z'_R)=1$$

$$e_R \neq e'_R$$

Then $(X, W') \in R$ holds true for the evidence $W'$ (evidence 216 in the diagram), where $W'=E_R(a_R, e_R, z_R, e'_R, z'_R)$
(Third Property)

Suppose the challenge value $e_R$ (challenge value 212 in the diagram) is a random number. Also suppose that the proof commitment $a_R$ (commitment 209 in the diagram proof) and the response $z_R$ (response 210 in the diagram) are expressed by the following equations, where $R_p$ is a random tape 206:

$$a_R=A_R(X, W, R_p)$$

$$z_R=Z_R(X, W, R_p, e_R)$$

On the other hand, suppose that the challenge value $e'_R$ (challenge value 216 in the diagram) is a random number. Also suppose that the proof commitment $a'_R$ (proof commitment 217 in the diagram) and the response $z'_R$ (response 218 in the diagram) are derived by the following equations, where $R_S$ is a random tape 219:

$$(a'_R, z'_R)=S_R(X, e'_R, R_S)$$

In this context, the distribution of $(a_R, e_R, z_R)$ obtained by randomly allocating the random tape $R_p$ (random tape 206 in the diagram) and the distribution of $(a'_R, e'_R, z'_R)$ obtained by randomly allocating the random tape $R_S$ (random tape 219 in the diagram) are difficult to be identified from each other.

Although an interactive proof performed by using SHVZ-KIP(R) involves a constraint that an $e_R$ selected by the verification apparatus must be random, such interactive proof is not zero-knowledge because there is generally no guarantee that the verification apparatus will always select an $e_R$ that is random.

However, there are many known SHVZKIP(R)'s that are efficient enough. It is thus meaningful in terms of application to use one of such SHVZKIP(R)'s to constitute a zero-knowledge interactive proof with a minimum decrease in efficiency.

An example of SHVZKIP(R) is shown below.
Suppose that X is the two elements (y,g) of Gq and W is the element x of Z/qZ, and that $(X,W) \in R$ if a relationship $y=g^x$ is satisfied.

The function $A_R$ may be a function, for example, as follows. The input of the function $A_R$ are X, W and the random tape $R_p$. The function $A_R$ generates $x' \in Z/qZ$, which is random, from $R_p$ and outputs $a_R$ for $a_R=y'=g^{x'}$.

The function $Z_R$ may be a function, for example, as follows. The input of the function $Z_R$ are X, W, the random tape $R_p$ and $e_R=c$. The function $Z_R$ calculates $z_R=r=xc+x'$ mod q and outputs $z_R$.

The function $V_R$ may be a function, for example, as follows. The input of the function $V_R$ are X, $a_R$, $e_R$ and $z_R$. The function $V_R$ outputs 1 if $g^r=y^c\ y'$ holds true; otherwise, it outputs 0.

The function $E_R$ may be a function, for example, as follows. The input of the function $E_R$ are $a_R$, $e_R=c$, $z_R=r$, $e'_R=c'$ and $z'_R=r'$. The function $E_R$ calculates $W=x=(r-r')/(c'-c)$ mod q and outputs W.

The function $S_R$ may be a function, for example, as follows. The input of the function $S_R$ are X, $e_R=c$ and the random tape $R_S$. The function $R_S$ generates $z_R=r \in Z/qZ$, which is random, from $R_S$ and also generates $a_R=y'=g^r y^{-c}$ It then outputs $(a_R, z_R)$.

(Non-Interactive Knowledge Proof)

A non-interactive knowledge proof will be explained below. In Related Art 2 described above, a prover proves to a verifier that an instance belongs to a certain language through an interaction (communication) between the proving apparatus and the verification apparatus. There is another method of proving that an instance belongs to a certain language. In this method, a prover is required to send data to a verifier only once. This is called a non-interactive proof. In particular, a proof designed to prove in polynomial time that the prover has an evidence with which it can be verified that an instance belongs to a certain language is called a non-interactive knowledge proof.

According to the method described in Literature 3, an example $(P_R)$ of non-interactive knowledge proof which proves to X that the prover knows R as expressed by $(X,W) \in R$ by using a special honest verifier zero-knowledge interactive proof can be formed as follows.

$$P_R=(a_R, z_R)$$

where $R_p$ is a random tape. It is assumed that the following relationships hold true:

$$a_R=A_R(X, W, R_p),$$

$$e_R=Hash(X, a_R),$$

$$a_R=A_R(X, W, R_p, e_R).$$

Literature 1: "Rafael Pass", "On Deniability in the Common Reference String and Random Oracle Model", "CRYPTO 2003",2003, p.316-337, p316-337

Literature 2: "Oded Goldreich", "Foundations of Cryptography—Basic Tools", "Cambridge University Press",2001, p.206-207

Literature 3: "Amos Fiat Adi Shamir", "How to Prove Yourself Practical Solutions to Identification and Signature Problems", "CRYPTO 1986", 1986, p.186-194

However, Related Art 1 has problems as described below.
In Related Art 1, it is necessary in Step 3 to generate, with respect to a sufficiently large t, at number of commitment{c[1, i] and c[2, i]}i=1, . . . , t. The reason for this is as follows. A simulation apparatus needs committed values x'[i] and x'[i]+x for both of the two commitments c[1, i]=Hash(x'[i], r[1, i]) and c[2, i]=Hash(x'[i]+x, r[2, i]). This means that the simulation apparatus will not work properly unless both the commitments are created correctly. During the operation of an actual verification apparatus, however, only one of the committed values is disclosed for each i. Therefore, the proving apparatus may not be aware if the hidden one of the committed values has been generated illegally. In order to avoid this problem, Related Art 1 generates a commitment for each of a sufficiently large number (t) of i's, so that the probability that the verification apparatus can cheat the proving apparatus with respect to all i's will be decreased to a sufficiently low level (½t).

For this reason, Related Art requires a verification apparatus to generate a large number of commitments and, in Step 6, requires a proving apparatus to perform a large number of calculations. These requirements lead to a drawback that calculation time as well as communication traffic between these apparatuses are increased.

As explained in the description of Related Art 1, Steps 1 to 5 represent a non-interactive zero-knowledge proof for discrete log knowledge. A comparison of this proof against the below-described non-interactive zero-knowledge proof for discrete log knowledge would reveal a large difference in the amounts of calculation and communication traffic between these proofs.

Suppose that $y=g^x$. The proving apparatus receives input of g, y, and x, while the verifier (verification apparatus) receives input of g and y.

Step 1: The proving apparatus selects $x' \in Z/qZ$ and generates $y'=gx'$.

Step 2: The proving apparatus calculates $c=Hash(g, y, y')$.

Step 3: The proving apparatus calculates $t=c\ x+x'$ mod q.

Step 4: The proving apparatus sends (t, c) to the verification apparatus.

Step 5: The verification apparatus verifies that $c=Hash(g, y, g^t y^{-c})$ holds.

Although communications and calculations in the non-interactive zero-knowledge proof shown above are those utilized in Related Art 1, the amounts of communications and calculations are merely at a level around 1/t times the amounts required by Related Art 1, implying a very high operational efficiency.

However, the method shown above cannot immediately be applied to the method according to Related Art 1, because although the simulation apparatus may retrieve the input (g, y, y') into the hash, it cannot obtain x from these values.

Related Art 2, on the other hand, provides many efficient methods for many R's but does not have the zero-knowledge nature, as described at the end of the description for Related Art 2. In particular, it would never have the nature of deniable zero-knowledge.

The present invention has been made to address the above-described problems. The object of the present invention is to enable a deniable zero-knowledge interactive proof which requires low amounts of communications and calculations when a method of special honest verifier zero-knowledge interactive proof is given.

SUMMARY

According to a first exemplary aspect of the invention, a proving apparatus which is communicably connected with a verification apparatus, comprises being communicably connected with a proof commitment generation apparatus which generates a proof commitment for a special honest verifier zero-knowledge interactive proof with respect to a predetermined relationship, based on a common input, an evidence and a random tape which respectively satisfy the predetermined relationship;

being communicably connected with a response generation apparatus which generates a response to a special honest verifier zero-knowledge interactive proof with respect to the relationship, based on a common input, an evidence, a random tape and a challenge value;

wherein includes a common input unit into which a common input and an evidence which respectively satisfy the relationship are inputted;

a random tape input unit into which a random tape is inputted;

a challenge value commitment reception unit which receives a commitment of a challenge value from the verification apparatus;

a proof commitment generation control unit which, on the reception of a commitment of a challenge value by the challenge value commitment reception unit, transmits the common input, the evidence and the random tape to the proof commitment generation apparatus to cause the proof commitment generation apparatus to generate a proof commitment and transmits the resultant proof commitment to the verification apparatus;

a challenge value reception unit which receives from the verification apparatus the challenge value and a random number which serves as an evidence for the commitment of the challenge value;

a challenge value commitment verification unit which, on the reception of the challenge value and the random number by the challenge value reception unit, verifies whether or not the commitment of the challenge value received by the challenge value commitment reception unit is the commitment of the challenge value received by the challenge value reception unit, by verifying whether or not the commitment of the challenge value received by the challenge value commitment reception unit matches the challenge value and the hash value of the random number received by the challenge value reception unit; and a response generation control unit which, if it has been determined that the commitment of the challenge value received by the challenge value commitment reception unit is the commitment of the challenge value received by the challenge value reception unit, transmits the common input, the evidence, the random tape and the challenge value to the response generation apparatus to cause the response generation apparatus to generate a response and transmits the resultant response to the verification apparatus.

According to a second exemplary aspect of the invention, a proving apparatus which is communicably connected with a verification apparatus, comprises being communicably connected with a first proof commitment generation apparatus which generates a proof commitment for a special honest verifier zero-knowledge interactive proof with respect to a pre-determined first relationship, based on a common input, an evidence and a random tape which respectively satisfy the first relationship;

being communicably connected with a first response generation apparatus which generates a response to a special honest verifier zero-knowledge interactive proof with respect to the first relationship, based on a common input, an evidence, a random tape and a challenge value all with respect to the first relationship:

being communicably connected with a second interactive proof verification apparatus which outputs a signal indicating acceptance or non-acceptance of a special honest verifier zero-knowledge interactive proof with respect to the second relationship, based on a common input, a proof commitment, a challenge value and a response all with respect to the second relationship;

being communicably connected with a simulation apparatus which generates a proof commitment and a response with respect to the second relationship, based on a common input, a challenge value and a random tape all with respect to the second relationship:

being communicably connected with a hash function calculation apparatus which calculates a hash function; wherein includes a common input reception unit into which a common input and an evidence that respectively satisfy a pre-determined first relationship are inputted;

a random tape input unit into which a first random tape and a second random tape are inputted;

a non-interactive proof reception unit which receives from the verification apparatus a non-interactive knowledge proof for an evidence that corresponds to the common input and the common input both with respect to the second relationship;

a non-interactive proof acceptance/non-acceptance determination unit which determines whether to accept or not accept the non-interactive proof, based on the result of communicating with the hash function calculation apparatus and the second interactive proof verification apparatus by using the non-interactive proof;

an evidence knowledge non-interactive proof generation unit which generates a non-interactive proof that proves knowledge of either the evidence for the common input with respect to the first relationship or the evidence for the common input with respect to the second relationship, by communicating with the simulation apparatus, the first proof commitment generation apparatus, the hash function calculation apparatus and the first response generation apparatus and by using during the communications the first random tape, the second random tape, the common input and the evidence that respectively satisfy the first relationship and the common input that is contained in the non-interactive proof; and a non-interactive proof transmission unit which transmits the non-interactive knowledge proof generated by the evidence knowledge non-interactive proof generation unit to the verification apparatus.

According to the present invention, it becomes possible to realize a deniable zero-knowledge interactive proof which requires low amounts of communications and calculations.

EXEMPLARY EMBODIMENT

An exemplary embodiment of the invention will now be described with reference to the drawings.

In the description below, there are references to a commitment of a challenge value. This "commitment" is different from that in "proof commitment" which appeared in the description above. First, this "commitment" will be explained. A "commitment of U (e.g., a challenge value)" refers to data with the following two properties. The first property is that no knowledge of U can be obtained when only a commitment of U is given and that an entity which has generated the commitment of U can prove later that the commitment is a commitment of U. The second property is that being a commitment of U' cannot be proved for any U' whenever U'≠U. A "commitment of a challenge value" referred to in the description below has these properties also.

First Exemplary Embodiment

Figure 1:
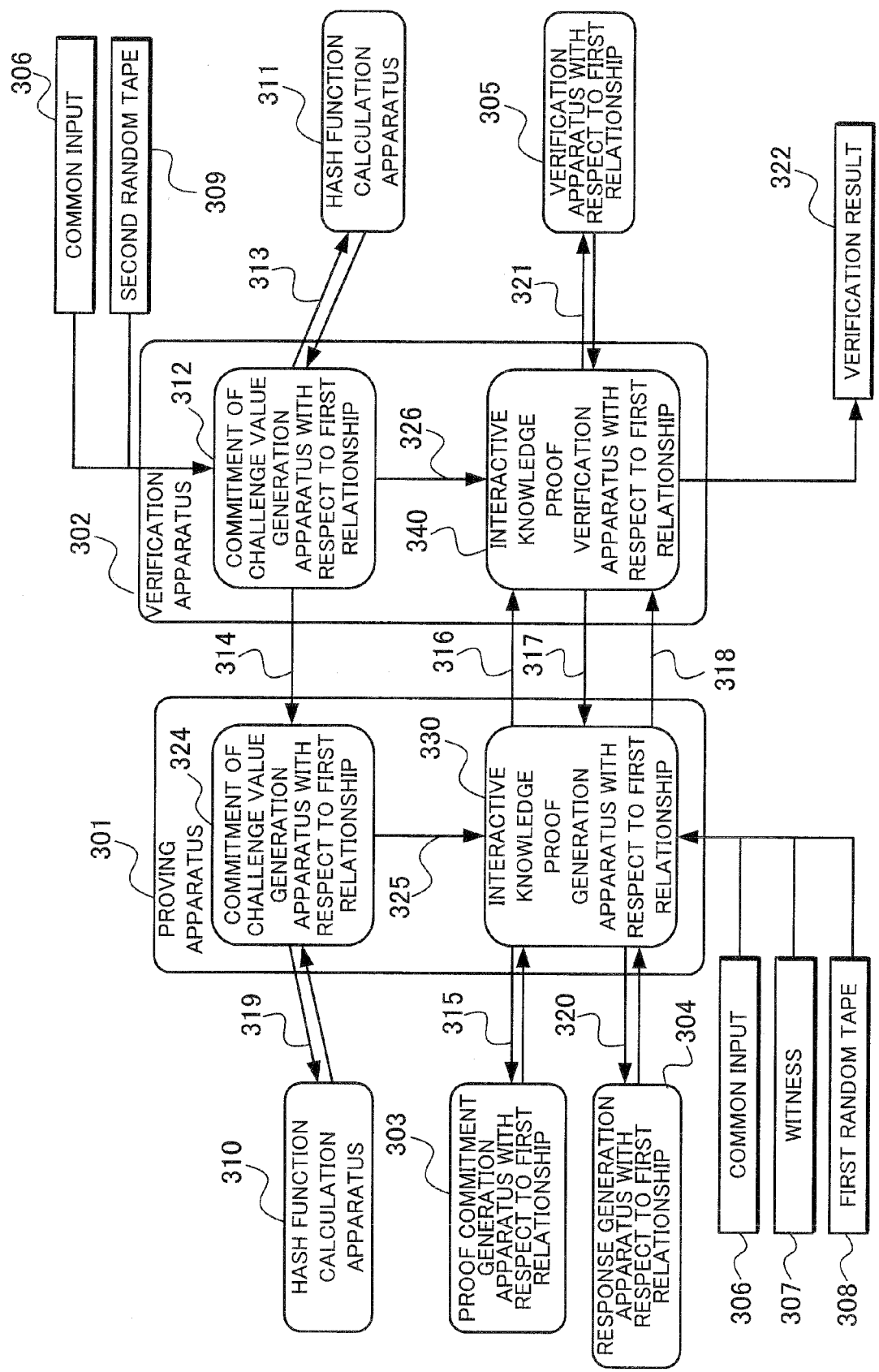
FIG. 1 is an illustrative diagram which shows a proving apparatus and a verification apparatus according to a first exemplary embodiment of the invention.

FIG. 1 is an illustrative diagram which shows a proving apparatus and a verification apparatus according to a first exemplary embodiment of the invention. The proving apparatus 301 and the verification apparatus 302 are connected in a mutually communicable manner. The proving apparatus 301 receives input of a common input X as expressed by (X, W)∈R, an evidence W and a first random tape RP. The relationship R is a pre-determined relationship. In this exemplary embodiment, the relationship R is referred to as a first relationship for descriptive purposes.

The common input is data that is inputted into both the proving apparatus and the verification apparatus. In the description of a second exemplary embodiment that appears later, a case is also described in which the verification apparatus generates data which is used as a common input (X' in the second exemplary embodiment) and sends it to the proving apparatus. Thus, data which is generated and sent to the proving apparatus by the verification apparatus can also serve as a common input.

The proving apparatus 301 comprises a commitment of challenge value verification apparatus 324 with respect to the first relationship (hereinafter, the "commitment of challenge value verification apparatus 324") and an interactive knowledge proof generation apparatus 330 with respect to the first relationship (hereinafter, the "proof generation apparatus 330").

The verification apparatus 312 comprises a commitment of challenge value generation apparatus 312 with respect to the first relationship (hereinafter, the "commitment of challenge value generation apparatus 312") and an interactive knowledge proof verification apparatus 340 with respect of the first relationship (hereinafter, the "proof verification apparatus 340").

The commitment of challenge value verification apparatus 324 is connected with a hash function calculation apparatus 310 in a communicable manner. The proof generation apparatus 330 is connected with a proof commitment generation apparatus 303 for a special honest verifier zero-knowledge interactive proof with respect to the first relationship R (hereinafter, the "proof commitment generation apparatus 303") in a communicable manner. The proof generation apparatus 330 is connected with a response generation apparatus 304 for a special honest verifier zero-knowledge interactive proof with respect to the first relationship R (hereinafter, the "response generation apparatus 304") in a communicable manner.

The commitment of challenge value verification apparatus 312 is connected with a hash function calculation apparatus 311 in a communicable manner. The proof verification apparatus 340 is connected with a verification apparatus 305 for a special honest verifier zero-knowledge interactive proof with respect to the first relationship R (hereinafter, the "interactive proof verification apparatus 305") in a communicable manner.

The proof commitment generation apparatus 303 generates a proof commitment by using a function (i.e., the function $A_R$) according to the input from the proof generation apparatus 330, and outputs it to the proof generation apparatus 330. A concrete example of calculation by the function $A_R$ according to this exemplary embodiment is similar to, for example, the one shown for the function $A_R$ described with respect to Related Art 2.

The response generation apparatus 304 generates a response by using a function (i.e., the function $Z_R$) according to the input from the proof generation apparatus 330, and outputs it to the proof generation apparatus 330. A concrete example of calculation by the function $Z_R$ according to this exemplary embodiment is similar to, for example, the one shown for the function $Z_R$ described with respect to Related Art 2.

The interactive proof verification apparatus 305 generates a verification result by using a function (i.e., the function $V_R$) according to the input from the proof verification apparatus 340, and outputs it to the proof verification apparatus 340. A concrete example of calculation by the function $V_R$ according to this exemplary embodiment is similar to, for example, the one shown for the function $V_R$ described with respect to Related Art 2. A verification result of 1 represents acceptance of the proof, while a verification result of 0 represents non-acceptance of the proof.

The commitment of challenge value verification apparatus 324 receives input of a commitment of challenge value ("c") from the commitment of challenge value generation apparatus 312. The commitment of challenge value verification apparatus 324 determines whether or not the result of calculation by the hash function using the challenge value and random number outputted from the proof verification apparatus 340 to the proof generation apparatus 330 matches the commitment of challenge value c.

The proof generation apparatus 330 receives input of a common input X described above, an evidence W and a first random tape $R_p$. The proof generation apparatus 330 causes the proof commitment generation apparatus 303 to generate a proof commitment and sends it to the proof verification apparatus 340. After this, a challenge value and a random number are inputted into the proof generation apparatus 330 from the proof verification apparatus 340. If the result of calculation by the hash function using the challenge value and random number matches the commitment of challenge value c, the proof generation apparatus 330 causes the response generation apparatus 304 to generate a response and sends it to the proof verification apparatus 340.

The commitment of challenge value generation apparatus 312 receives input of a common input X and a second random tape RV. The commitment of challenge value generation apparatus 312 then generates a challenge value and a random number and causes the hash function calculation apparatus 311 to generate a commitment of challenge value c. The commitment of challenge value generation apparatus 312 outputs the commitment of challenge value c, and outputs it to the commitment of challenge value verification apparatus 324.

The proof verification apparatus 340 receives input of a proof commitment from the proof generation apparatus 330. The proof verification apparatus 340 then outputs the challenge value and the random number to the proof generation apparatus 330. Following this, a response is inputted from the proof generation apparatus 330. On receiving the response, the proof verification apparatus 340 causes the interactive proof verification apparatus 305 to generate a verification result and outputs the verification result 322.

In FIG. 1, the common input X is indicated with the code number 306, the evidence W with the code number 307, the first random tape $R_p$ with the code number 308, and the second random tape $R_V$ with the code number 309.

Next, the operation which takes place during a deniable zero-knowledge interactive proof for the relationship R between the proving apparatus 301 and the verification apparatus 302 will be described.

First, the proof generation apparatus 330 of the proving apparatus 301 receives input of a common input X as expressed by (X, W)∈R, a evidence W and a first random tape $R_p$.

Then, the common input X and a second random tape $R_V$ are inputted into the commitment of challenge value generation apparatus 312 incorporated in the verification apparatus 302.

Following this, the commitment of challenge value generation apparatus 312 causes the hash function calculation apparatus 311 to generate a commitment of challenge value with respect to the first relationship R in the following manner. Using the second random tape $R_V$, the commitment of challenge value generation apparatus 312 selects a challenge value $e_R$. Also using the second random tape $R_V$, the commitment of challenge value generation apparatus 312 selects a random number r. The random number r serves as an evidence for the commitment of the challenge value. The commitment of challenge value generation apparatus 312 transmits the challenge value $e_R$ and the random number r to the hash function calculation apparatus 311. The hash function calculation apparatus 311 calculates the commitment of challenge value c using the equation c=Hash($e_R$, r), and transmits the commitment of challenge value c to the commitment of challenge value generation apparatus 312. In FIG. 1, communications that take place in this step is shown as communications 313.

The commitment of challenge value generation apparatus 312 transmits the commitment of challenge value c received from the hash function calculation apparatus 311 to the commitment of challenge value verification apparatus 324 (communication 314 in FIG. 1). The commitment of challenge value verification apparatus 324 waits for the commitment of challenge value generation apparatus 312 to transmit the commitment of challenge value c, and receives the commitment of challenge value c from the commitment of challenge value generation apparatus 312.

When the commitment of challenge value verification apparatus 324 receives the commitment of challenge value c, the proof generation apparatus 330 transmits the common input X, the evidence W and the first random tape $R_p$ to the proof commitment generation apparatus 303. Using the function $A_R$, the proof commitment generation apparatus 303 generates a proof commitment $a_R$ based on $a_R=A_R(x, w, R_p)$ The proof commitment generation apparatus 303 then transmits the proof commitment $a_R$ to the proof generation apparatus 330. In FIG. 1, communications that take place in this step is shown as communications 315.

The proof generation apparatus 330 transmits the proof commitment $a_R$ received from the proof commitment generation apparatus 303 to the proof verification apparatus 340 (communications 316 in FIG. 1). On transmitting the proof commitment $a_R$, the proof generation apparatus 330 begins to wait for the proof verification apparatus 340 to transmit the challenge value committed by the commitment of challenge value c and the evidence of that commitment (random number r).

On receiving the proof commitment $a_R$, the proof verification apparatus 340 transmits the challenge value $e_R$ and the random number r to the proof generation apparatus 330 (communication 317 in FIG. 1) On transmitting the challenge value $e_R$ and the random number r, the proof verification apparatus 340 begins to wait for the proof generation apparatus 330 to transmit a response.

On the reception of the challenge value $e_R$ and the random number r by the proof generation apparatus 330, the commitment of challenge value verification apparatus 324 communicates with the hash function calculation apparatus 310 (communications 319 in FIG. 1) and determines whether or not the result of calculation by the hash function using the challenge value $e_R$ and the random number r matches the commitment of challenge value c. More specifically, the commitment of challenge value verification apparatus 324 causes the hash function calculation apparatus 310 to calculate Hash ($e_R$, r), and determines whether or not the result of calculation matches the commitment of challenge value c which it has already received. In other words, it verifies, by using the random number r, whether the already-received commitment of challenge value c is the commitment of the challenge value $e_R$.

If c=Hash($e_R$, r) does not hold true, the commitment of challenge value verification apparatus 324 outputs an instruction to stop the proving apparatus 301 to the proof generation apparatus 330 (output 325 in FIG. 1). If a stop instruction is outputted, the proving apparatus 301 stops its operation. If c=Hash($e_R$, r) holds true, a stop instruction is not outputted.

If a stop instruction is not outputted, the proof generation apparatus 330 transmits the common input X, the evidence W, the challenge value $e_R$ and the first random tape $R_p$ to the response generation apparatus 304. Using the function $Z_R$, the response generation apparatus 304 generates a response $z_R$ based on $z_R$ $Z_R$(x, w, $e_R$, $R_p$). The response generation apparatus 304 then transmits the response $z_R$ to the proof generation apparatus 330. In FIG. 1, communications that take place in this step is shown as communications 320.

The proof generation apparatus 330 transmits the response $z_R$ received from the response generation apparatus 304 to the proof verification apparatus 340 (communications 318 in FIG. 1).

On receiving the response $z_R$, the proof verification apparatus 340 transmits the common input X, the proof commitment $a_R$, the challenge value $e_R$ and the response $z_R$ to the interactive proof verification apparatus 305. It suffices for the proof verification apparatus 340 to receive only the challenge value $e_R$ from the commitment of challenge value generation apparatus 312 (communication 326 in FIG. 1). Using the function $V_R$, the interactive proof verification apparatus 305 derives a calculation result for $V_R$(X, $a_R$, $e_R$, $z_R$). This calculation result is, for example, either 1 or 0, which respectively represents acceptance or non-acceptance of the proof. The interactive proof verification apparatus 305 transmits a signal which indicates acceptance or non-acceptance of the proof to the proof verification apparatus 340. In FIG. 1, communications that take place in this step is shown as communications 321.

The proof verification apparatus 340 transmits the received signal (which indicates acceptance or non-acceptance of the proof) as a verification result 322.

According to the first exemplary embodiment, transmissions from the verification apparatus 302 to the proving apparatus 301 are limited to a transmission of a commitment of challenge value c (communication 314 in FIG. 1) and a transmission of data which indicates that the commitment is a commitment of challenge value (communication 317 in FIG. 1). The first exemplary embodiment can thus achieve high communication efficiency by reducing the amount of communication traffic and simplifying the process.

In the first exemplary embodiment, the common input unit, the random tape input unit, the proof commitment generation control unit, the challenge value reception unit and the response generation control unit which are included in the proving apparatus are realized by the proof generation apparatus 330 of the proving apparatus 301. The challenge value commitment reception unit and the challenge value commitment verification unit included in the proving apparatus are realized by the commitment of challenge value verification apparatus 324 of the proving apparatus 301.

The common input unit, the random tape input unit, the challenge value generation unit, the random number generation unit and the challenge value commitment generation control unit included in the verification apparatus are realized by the commitment of challenge value generation apparatus 312 of the verification apparatus 302. The proof commitment reception unit, the response reception unit and the verification result output unit included in the verification apparatus are realized by the proof verification apparatus 340 of the verification apparatus 303.

Second Exemplary Embodiment

In the description below, the exclusive-OR for each bit is denoted by the symbol ∨∨.

Figure 2:
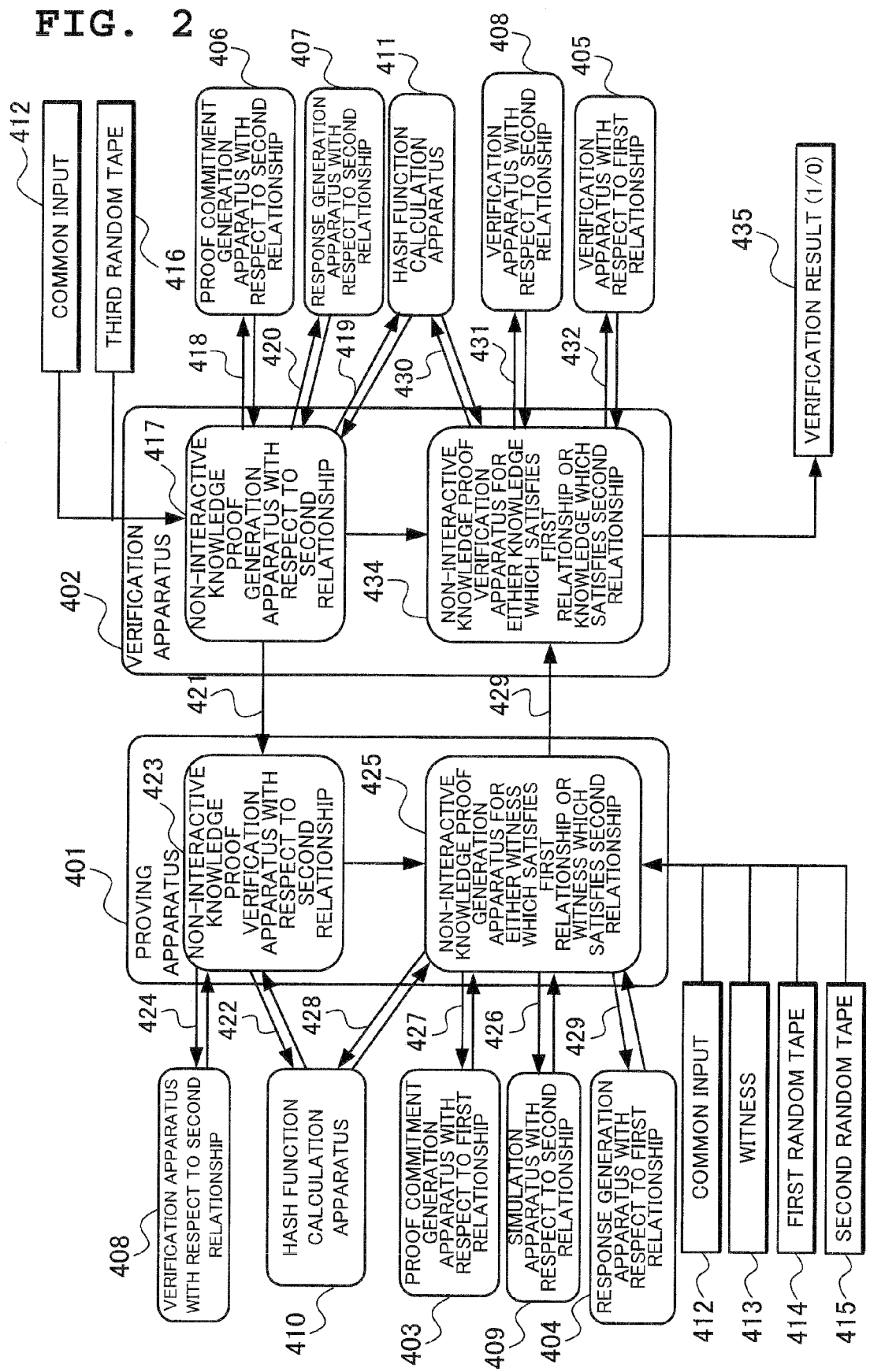
FIG. 2 is an illustrative diagram which shows a proving apparatus and a verification apparatus according to a second exemplary embodiment of the invention.

FIG. 2 is an illustrative diagram which shows a proving apparatus and a verification apparatus according to a second exemplary embodiment of the invention. The proving apparatus 401 and the verification apparatus 402 are connected with each other in a mutually communicable manner. The proving apparatus 401 receives input of a common input X as expressed by (X, W)∈R, an evidence W, a first random tape $R_p$ and a second random tape $R'_p$. The relationship R is a predetermined relationship and will be referred to as a first relationship. A second relationship differs from the first relationship R and will be assigned a symbol R'.

The proving apparatus 401 comprises a non-interactive knowledge proof verification apparatus 423 with respect to a second relationship (hereinafter, the "second relationship proof verification apparatus 423") and a non-interactive knowledge proof generation apparatus 425 for either an evidence which satisfies the first relationship or an evidence which satisfies the second relationship (hereinafter, the "proof generation apparatus 425").

The verification apparatus 402 comprises a non-interactive knowledge proof generation apparatus 417 with respect to the second relationship (hereinafter, the "second relationship proof generation apparatus 417") and a non-interactive knowledge proof verification apparatus 434 for either knowledge which satisfies the first relationship or knowledge which satisfies the second relationship (hereinafter, the "proof verification apparatus 434").

The second relationship proof verification apparatus 423 is connected with a hash function calculation apparatus 410 in a communicable manner. The second relationship proof verification apparatus 423 is also connected with a verification apparatus 408 for a special honest verifier zero-knowledge interactive proof with respect to the second relationship R' (hereinafter, the "second interactive proof verification apparatus 408") in a communicable manner.

The proof generation apparatus 425 is connected with the hash function calculation apparatus 410 in a communicable manner. The proof generation apparatus 425 is connected with a proof commitment generation apparatus 403 for a special honest verifier zero-knowledge interactive proof with respect to the first relationship R (hereinafter, the "first proof commitment generation apparatus 403") in a communicable manner. The proof generation apparatus 425 is connected with a response generation apparatus 404 for a special honest verifier zero-knowledge interactive proof with respect to the first relationship R (hereinafter, the first response generation apparatus 404") in a communicable manner. The proof generation apparatus 425 is further connected with a simulation apparatus 409 for a special honest verifier zero-knowledge interactive proof with respect to the second relationship R' (hereinafter, the second relationship simulation apparatus 409") in a communicable manner.

The second relationship proof verification apparatus 417 is connected with a hash function calculation apparatus 411 in a communicable manner. The second relationship proof generation apparatus 417 is connected with a proof commitment generation apparatus 406 for a special honest verifier zero-knowledge interactive proof with respect to the second relationship R' (hereinafter, the "second proof commitment generation apparatus 406") in a communicable manner. The second relationship proof generation apparatus 417 is further connected with a response generation apparatus 407 for a special honest verifier zero-knowledge interactive proof with respect to the second relationship R' (hereinafter, the "second response generation apparatus 407") in a communicable manner.

The proof generation apparatus 434 is connected with a hash function calculation apparatus 411 in a communicable manner. The proof verification apparatus 434 is connected with a verification apparatus 405 for a special honest verifier zero-knowledge interactive proof with respect to the first relationship R (hereinafter, the "first interactive proof verification apparatus 405") in a communicable manner. The proof verification apparatus 434 is further connected with the second interactive proof verification apparatus 408 in a communicable manner.

The first proof commitment generation apparatus 403 generates a proof commitment by using a function (i.e., the function $A_R$) according to the input from the proof generation apparatus 425, and outputs it to the proof generation apparatus 425. A concrete example of calculation by the function $A_R$ according to this exemplary embodiment is similar to, for example, the one shown for the function $A_R$ described with respect to Related Art 2.

The first response generation apparatus 404 generates a response by using a function (i.e., the function $Z_R$) according to the input from the proof generation apparatus 425, and outputs it to the proof generation apparatus 425. A concrete example of calculation by the function $Z_R$ according to this exemplary embodiment is similar to, for example, the one shown for the function $Z_R$ described with respect to Related Art 2.

The first interactive proof verification apparatus 405 generates a verification result (a signal representing acceptance or non-acceptance of the proof) by using a function (i.e., the function $V_R$) according to the input from the proof verification apparatus 434, and outputs it to the proof verification apparatus 434. A concrete example of calculation by the function $V_R$ according to this exemplary embodiment is similar to, for example, the one shown for the function $V_R$ described with respect to Related Art 2. A verification result of 1 represents acceptance of the proof, while a verification result of 0 represents non-acceptance of the proof.

The second proof commitment generation apparatus 406 generates a proof commitment (denoted as $a_{R'}$) by using a function (i.e., the function $A_{R'}$) according to the input from the second relationship proof generation apparatus 417, and outputs it to the second relationship proof generation apparatus 417. The function $A_{R'}$ is a function which receives input of a common input, an evidence and a random tape and outputs a proof commitment.

In this description, it is assumed that the function $A_{R'}$ is a function which performs a different calculation from the function $A_R$. However, if the first relationship R and the second relationship R' are the same relationship, then the function $A_{R'}$ may be a function which performs the same calculation as the function $A_R$.

The second response generation apparatus 407 generates a response by using a function (i.e., the function $Z_{R'}$) according to the input from the second relationship proof generation apparatus 417, and outputs it to the second relationship proof generation apparatus 417. The function $Z_{R'}$ is a function which receives input of a common input, an evidence and a random tape and outputs a response (denoted as $z_R$). In this description, it is assumed that the function $Z_{R'}$ is a function which performs a different calculation from the function $Z_R$. However, if the first relationship R and the second relationship R' are the same relationship, then the function $Z_{R'}$ may be a function which performs the same calculation as the function $Z_R$.

The second interactive proof verification apparatus 408 generates a verification result (a signal representing acceptance or non-acceptance of the proof) by using a function (i.e., the function $V_{R'}$) according to the input from the second relationship proof verification apparatus 423 or the proof verification apparatus 424 and outputs the verification result to the second relationship proof verification apparatus 423 or the proof verification apparatus 424. The function $V_{R'}$ is a function which receives input of a proof commitment, a response, common input and a challenge value, and outputs a verification result. In this description, it is assumed that the function $V_{R'}$ is a function which performs a different calculation from the function $V_R$. However, if the first relationship R and the second relationship R' are the same relationship, then the function $V_{R'}$ may be a function which performs the same calculation as the function $V_R$. A verification result of 1 represents acceptance of the proof, while a verification result of 0 represents non-acceptance of the proof.

The second relationship simulation apparatus 409 outputs a proof commitment and a response by using a function (i.e., the function $S_{R'}$) according to the input from the proof generation apparatus 425. The function $S_{R'}$ is a function which receives input of a common input, a challenge value and a random tape and outputs a proof commitment and a response. A concrete example of calculation by the function $S_{R'}$ according to this exemplary embodiment is similar to, for example, the one shown for the function $S_R$ described with respect to Related Art 2.

The second relationship proof generation apparatus 417 receives input of a common input X and a third random tape, wherein $R_V$ and $R'_V$ are inputted as the third random tape. The second relationship proof generation apparatus 417 outputs a non-interactive knowledge proof for the second relationship R' (the proof is denoted as $P_{R'}$) to the second relationship proof verification apparatus 434.

Using a non-interactive knowledge proof $P_{R'}$ for the second relationship R', the second relationship proof verification apparatus 423 determines whether or not a pre-determined relational expression holds true.

The certification generation apparatus 425 receives input of a common input X, an evidence W, a first random tape $R_p$ and a second random tape $R'_p$, which have been describe above. The certification generation apparatus 425 then non-interactively generates a proof of knowledge with respect to either an evidence which satisfies the first relationship or an evidence which satisfies the second relationship (on the assumption that $P_R \vee R'$) and outputs the proof to the proof verification apparatus 434.

The proof verification apparatus 434 outputs a signal which indicates acceptance or non-acceptance of the proof $P_R \vee R'$ as a verification result 435, based on the results of communication with the first interactive proof verification apparatus 405 and the second interactive proof verification apparatus 408.

In FIG. 2, the common input X is indicated with the code number 412, the evidence W with the code number 413, the first random tape $R_p$ with the code number 414, the second random tape $R'_p$ with the code number 415, and the third random tape $R_V$ and $R'_V$ with the code number 416.

Next, the operation which takes place during a deniable zero-knowledge interactive proof for the relationship R between the proving apparatus 401 and the verification apparatus 402 will be described.

First, the proof generation apparatus 425 of the proving apparatus 401 receives input of a common input X as expressed by (X, W)∈R, an evidence W, a first random tape $R_p$ and a second random tape $R'_p$.

Following this, the second relationship proof generation apparatus 417 of the verification apparatus 402 receives input of the common input X and the third random tape $R_V$ and $R'_V$.

The second relationship proof generation apparatus 417 then generates a non-interactive knowledge proof $P_{R'}$ for the second relationship R', as described below.

Using $R'_V$ within the third random tape, the second relationship proof generation apparatus 417 uniformly and randomly generates X' and W' as expressed by (X', W')∈R'(which are common input and evidence for the second relationship R', respectively).

Next, the second relationship proof generation apparatus 417 transmits the common input X', the evidence W' and $R_V$ within the third random tape to the second proof commitment generation apparatus 406. Using the function $A_{R'}$, the second proof commitment generation apparatus 406 generates a proof commitment $a_{R'}$ based on $a_{R'}=A_{R'}(X', W', R_V)$.

The second proof commitment generation apparatus 406 then transmits the proof commitment $a_{R'}$ to the second relationship proof generation apparatus 417. In FIG. 2, communications that take place in this step are shown as communications 418.

Next, the second relationship proof generation apparatus 417 transmits the common input X' and the proof commitment $a_{R'}$ to the hash function calculation apparatus 411. The hash function calculation apparatus 411 calculates a hash value based on $e_{R'}=\text{Hash}(X', a_{R'})$.

The hash function calculation apparatus 411 transmits the hash value $e_{R'}$ to the second relationship proof generation apparatus 417. In FIG. 2, communications that take place in this step are shown as communications 419.

Next, the second relationship proof generation apparatus 417 transmits the common input X', the evidence W', the hash value $e_{R'}$, and $R_V$ within the third random tape to the second response generation apparatus 407, wherein the hash value $e_{R'}$ is transmitted as a challenge value. Using the function $Z_{R'}$, the second response generation apparatus 407 generates a response $z_{R'}$ based on $z_{R'}=Z_{R'}(X', W', e_{R'}, R_V)$. The second response generation apparatus 407 then transmits the response $z_{R'}$ to the second relationship proof generation apparatus 417. In FIG. 2, communications that take place in this step are shown as communications 420.

The second relationship proof generation apparatus 417 assumes that a non-interactive knowledge proof $P_{R'}$ for the second relationship R' is (X', $a_{R'}$, $z_{R'}$). The second relationship proof generation apparatus 417 transmits the proof $P_{R'}=(X', a_{R'}, z_{R'})$ generated as described above to the second relationship proof verification apparatus 423 (communication 421 in FIG. 2).

The second relationship proof verification apparatus 423 waits for the second relationship proof generation apparatus 417 to transmit the proof $P_{R'}$ (which is a non-interactive proof of knowledge with respect to the common input X' for the second relationship R' and the evidence W' corresponding to that common input X'), and receives the proof $P_{R'}=(X', a_{R'}, z_{R'})$ through the communication 421 above.

The second relationship proof verification apparatus 423 of the proving apparatus 401 verifies the non-interactive knowledge proof $P_{R'}$ for the second relationship R' as described below.

The second relationship proof verification apparatus 423 transmits the common input X' and the proof commitment $a_{R'}$ to the hash function calculation apparatus 410. The hash function calculation apparatus 410 calculates a hash value based on $e_{R'}=\text{Hash}(X', a_{R'})$. The hash function calculation apparatus 410 transmits the hash value $e_{R'}$ to the second relationship proof verification apparatus 423. In FIG. 2, communications that take place in this step are shown as communications 422.

The second relationship proof verification apparatus 423 transmits the common input X', the proof commitment $a_{R'}$, the hash value $e_{R'}$, and the response $z_{R'}$ to the second interactive proof verification apparatus 408, wherein the hash value $e_{R'}$ is transmitted as a challenge value. The second interactive proof verification apparatus 408 derives a calculation result for $V_{R'}(X', a_{R'}, e_{R'}, z_{R'})$ by using the function $V_{R'}$, and transmits the calculation result to the second relationship proof verification apparatus 423. In FIG. 2, communications that take place in this step are shown as communications 424.

The second relationship proof verification apparatus 423 determines whether or not $V_{R'}(X', a_{R'}, e_{R'}, z_{R'})=1$ holds true. If it does not hold true, the second relationship proof verification apparatus 423 stops the proving apparatus 401. If it holds true, the proving apparatus 401 performs the following operation. That is, if $V_{R'}(X', a_{R'}, e_{R'}, z_{R'})=1$ holds true, the proving apparatus 401 decides acceptance of the proof $P_{R'}$; otherwise, it decides non-acceptance of the proof $P_{R'}$.

The proof generation apparatus 425 of the proving apparatus 401 generates a non-interactive knowledge proof $P_{R \vee R'}$ with respect to either an evidence which satisfies the first relationship R or an evidence which satisfies the second relationship R' in the following manner.

Using the second random tape $R'_p$, the proof generation apparatus 425 generates a random number $e'_{R'}$ and sets it as a challenge value for the second relationship R'.

Next, the proof generation apparatus 425 transmits the common input X', the challenge value $e'_{R'}$ and the second random tape $R'_p$ to the second relationship simulation apparatus 409, and causes the second relationship simulation apparatus 409 to generate a proof commitment $a'_{R'}$ and a response $z'_{R'}$ with respect to the second relationship R'. The second relationship simulation apparatus 409 derives $(a'_{R'}, z'_{R'})=S_{R'}(X', e'_{R'}, R'_p)$ by using the function $S_{R'}$, and transmits the proof commitment $a'_{R'}$ and the response $z'_{R'}$ to the proof generation apparatus 425. In FIG. 2, communications that take place in this step are shown as communications 426.

The proof generation apparatus 425 then transmits the common input X, the evidence W and the first random tape $R_p$ to the first proof commitment generation apparatus 403. The first proof commitment generation apparatus 403 generates a proof commitment $a_R$ by using the function $A_R$, based on $a_R=A_R(x, w, R_p)$, and transmits it to the proof generation apparatus 425. In FIG. 2, communications that take place in this step are shown as communications 427.

The proof generation apparatus 425 then transmits the common input X and the proof commitment $a_R$ with respect to the first relationship R, as well as the common input X' and the proof commitment $a'_{R'}$ with respect to the second relationship R', to the hash function calculation apparatus 410. The hash function calculation apparatus 410 calculates a hash value e based on e=Hash(X, $a_R$, X', $a'_{R'}$), and transmits the resultant hash value to the proof generation apparatus 425. In FIG. 2, communications that take place in this step are shown as communications 428.

Next, the proof generation apparatus 425 calculates a challenge value $e_R$ based on $e_R$=e $\vee$ $e'_{R'}$. The proof generation apparatus 425 transmits the common input X, the evidence W, the challenge value $e_R$ and the first random tape $R_p$ to the first response generation apparatus 404, and causes the first response generation apparatus 404 to generate a response $z_R$. The first response generation apparatus 404 generates a response $z_R$ by using the function $Z_R$, based on $z_R$=$Z_R$(X, W, $e_R$, $R_p$), and transmits the response $z_R$ to the proof generation apparatus 425. In FIG. 2, communications that take place in this step are shown as communications 429.

The proof generation apparatus 425 sets the non-interactive knowledge proof $P_{R \vee R'}$ with respect to either an evidence which satisfies the first relationship R or an evidence which satisfies the second relationship R', as ($a_R$, $e_R$, $z_R$, $a'_{R'}$, $e'_{R'}$, $z'_{R'}$). The proof generation apparatus 425 transmits the proof $P_{R \vee R'}$=($a_R$, $e_R$, $z_R$, $a'_{R'}$, $e'_{R'}$, $z'_{R'}$) generated as described above to the proof verification apparatus 434 of the verification apparatus 402 (communication 429 in FIG. 2).

The proof verification apparatus 434 transmits the common input X (the common input X which has been inputted into the verification apparatus 402), the proof commitment $a_R$, the common input X' and the proof commitment $a'_{R'}$ to the hash function calculation apparatus 411, and causes the hash function calculation apparatus 411 to calculate a hash value. The hash function calculation apparatus 411 derives a calculation result for Hash (X, $a_R$, X', $a'_{R'}$) and transmits the calculation result (hash value) to the proof verification apparatus 434. In FIG. 2, communications that take place in this step are shown as communications 430. The proof verification apparatus 434 then determines whether or not the calculation result for Hash (X, $a_R$, X', $a'_{R'}$) is equal to $e_R \vee e'_{R'}$.

Next, the proof verification apparatus 434 transmits the common input X, the proof commitment $a_R$, the challenge value $e_R$ and the response $z_R$ to the first interactive proof verification apparatus 405. The first interactive proof verification apparatus 405 derives a calculation result for $V_R$(X, $a_R$, $e_R$, $z_R$) by using the function $V_R$, and transmits the calculation result to the proof verification apparatus 434. In FIG. 2, communications that take place in this step are shown as communications 432. The proof verification apparatus 434 then determines whether or not $V_R$(X, $a_R$, $e_R$, $z_R$)=1 holds true.

Next, the proof verification apparatus 434 transmits the common input X', the proof commitment $a'_{R'}$, challenge value $e'_{R'}$, response $z'_{R'}$ to the second interactive proof verification apparatus 408. The second interactive proof verification apparatus 408 derives a calculation result for $V_R$(X', $a'_{R'}$, $e'_{R'}$, $z'_{R'}$) by using the function $V_{R'}$, and transmits the calculation result to the proof verification apparatus 434. In FIG. 2, communications that take place in this step are shown as communications 431. The proof verification apparatus 434 determines whether or not $V_{R'}$(X', $a'_{R'}$, $e'_{R'}$, $z'_{R'}$)=1 holds true.

If all the determinations above hold true, i.e., if all of Hash(X, $a_R$, X', $a'_{R'}$)=$e_R \vee e'_{R'}$, $V_R$(X, $a_R$, $e_R$, $z_R$)=1 and $V_{R'}$(X', $a'_{R'}$, $e'_{R'}$, $z'_{R'}$)=1 hold true, the proof verification apparatus 434 outputs "1" as a verification result 435, and otherwise the proof verification apparatus 434 outputs "0" as a verification result 435, wherein "1" indicates acceptance of the proof $P_{R \vee R'}$ and "0" indicates non-acceptance of the proof $P_{R \vee R'}$.

Figure 4:
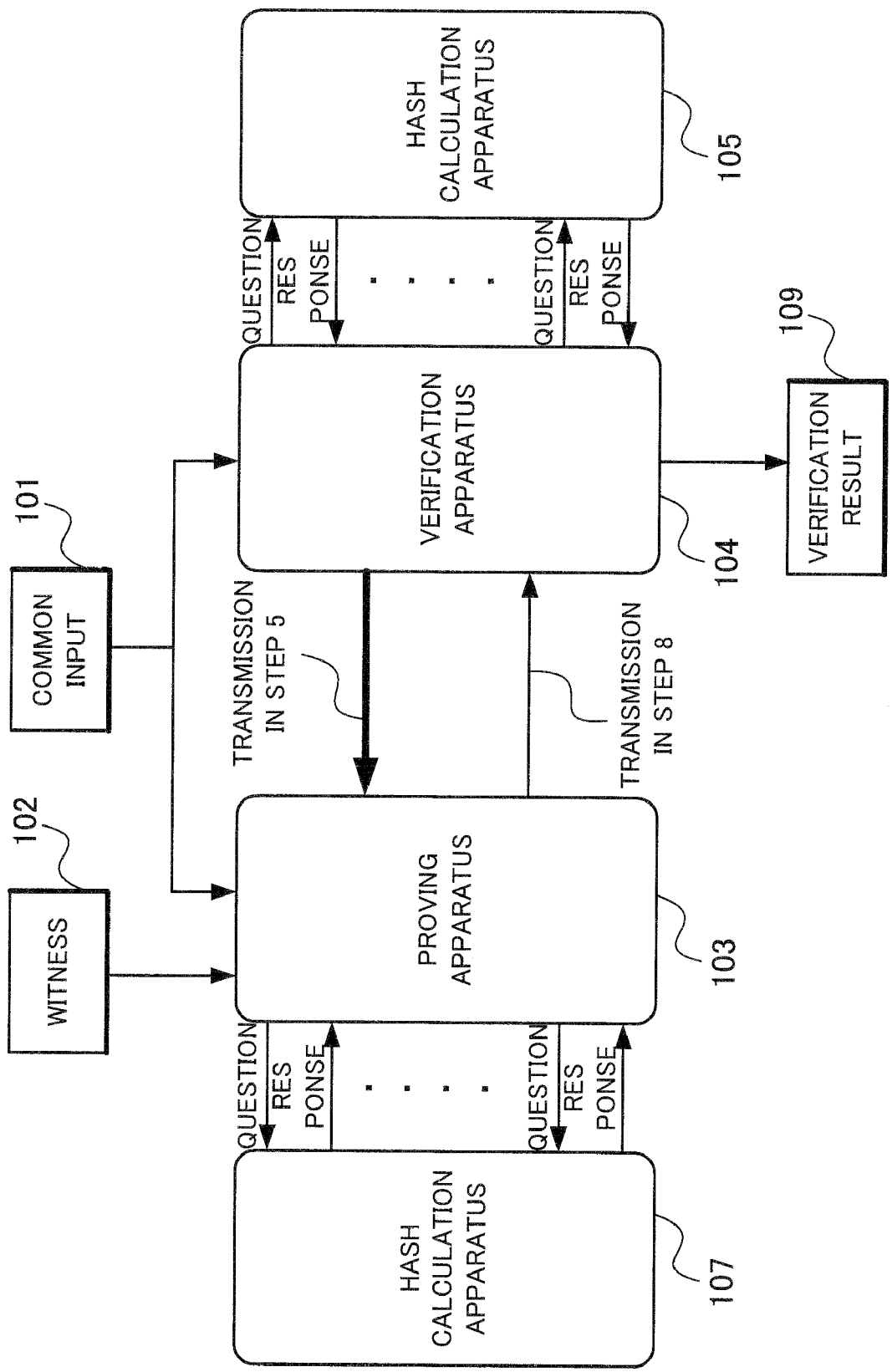
FIG. 4 is an illustrative diagram which shows the configuration disclosed in Literature 1.
Figure 5:
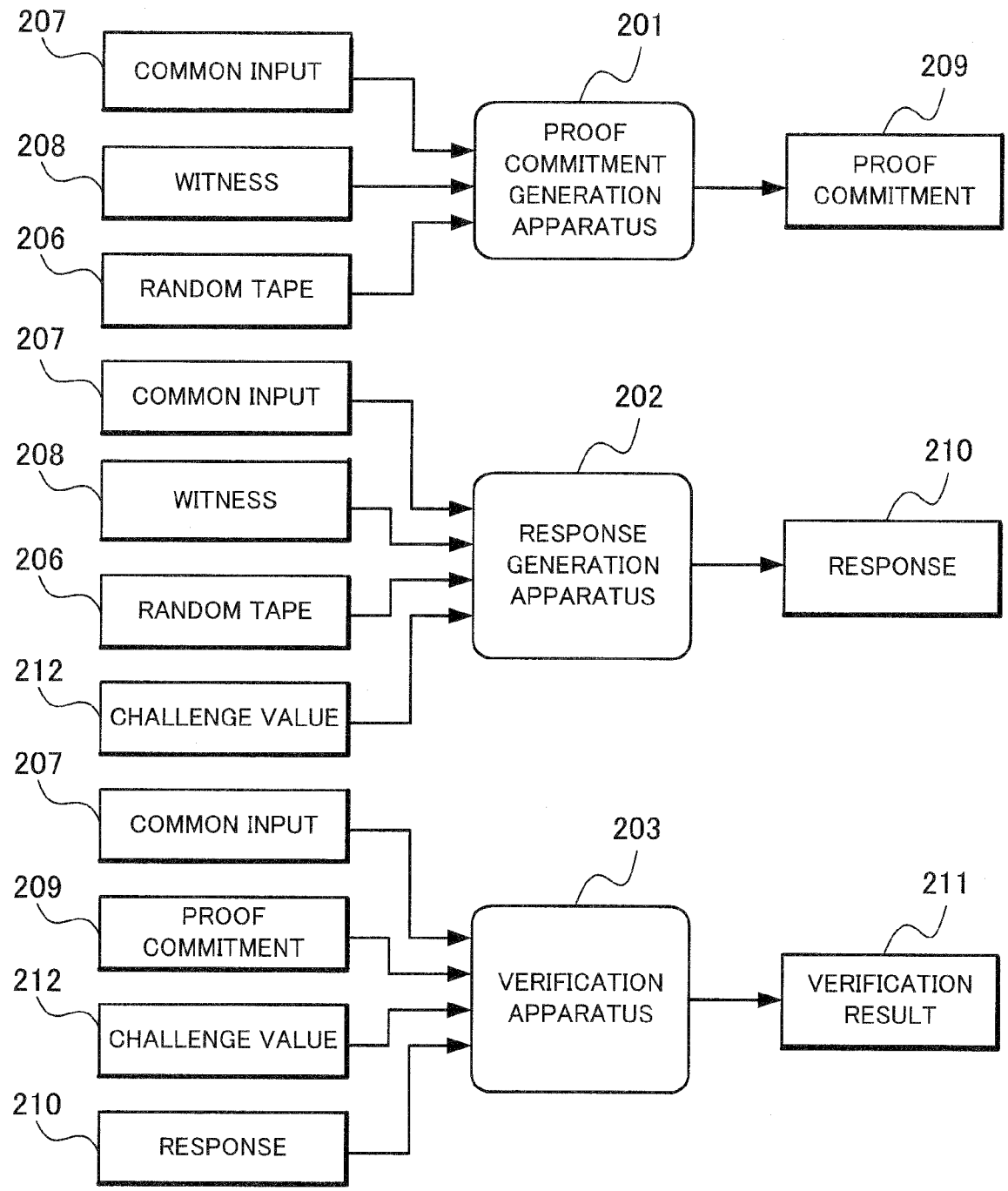
FIG. 5 is an illustrative diagram which shows the configuration disclosed in Literature 2.
Figure 6:
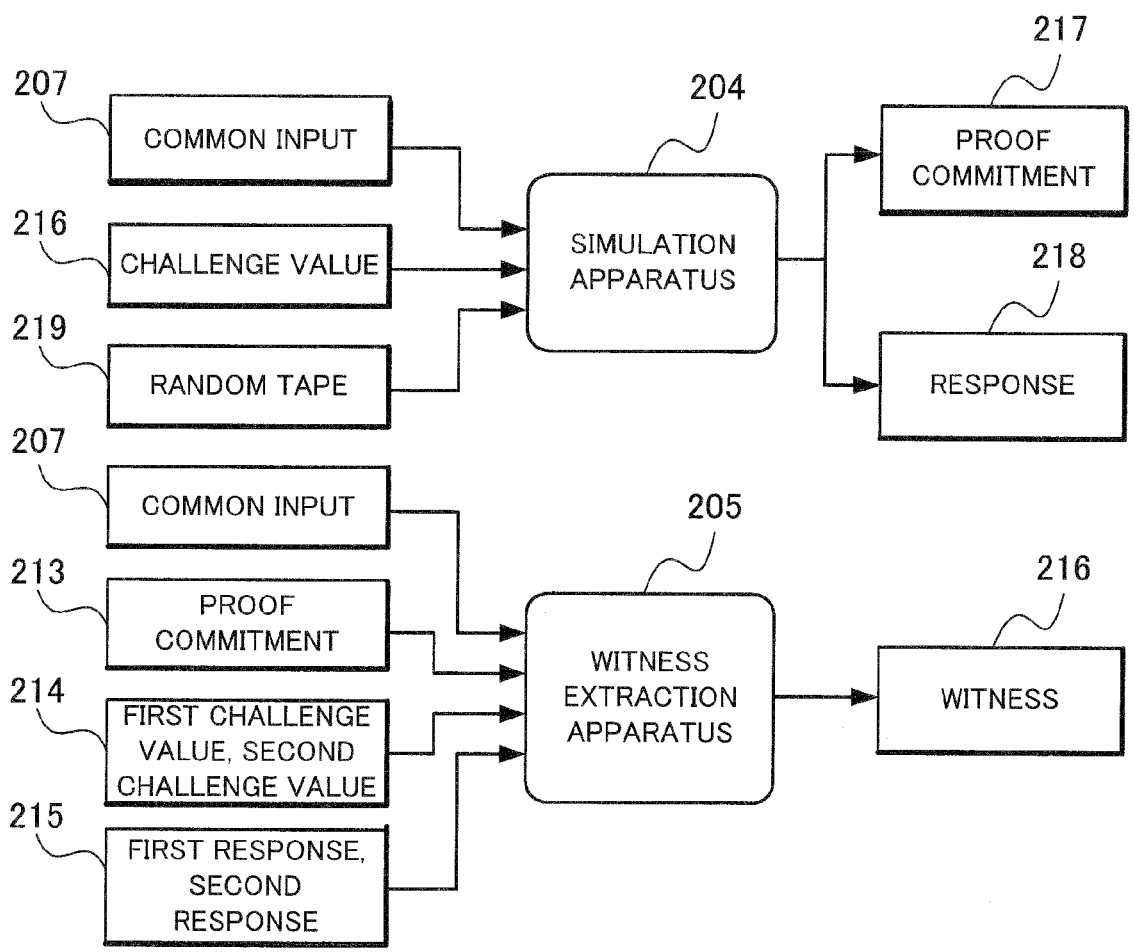
FIG. 6 is an illustrative diagram which shows the configuration disclosed in Literature 2.

The second exemplary embodiment can thus operate with a low amount of traffic from the verification apparatus 402 to the proving apparatus 401 and can reduce amounts of communication traffic and calculation. For example, in Related Art 1 shown in FIG. 4, the verification apparatus transmits a 2t number of c[1, i], c[2, i] to the proving apparatus. On the other hand, in the second exemplary embodiment, the verification apparatus 402 transmits only the proof $P_{R'}$ to the proving apparatus 401. Thus, according to the present invention, it becomes possible to reduce amounts of communications and calculations.

In the second exemplary embodiment, the non-interactive proof reception unit and the non-interactive proof acceptance/non-acceptance determination unit, which are included in the proving apparatus, are realized by the second relationship proof verification apparatus 423 of the verification apparatus 402. The common input reception unit, the random tape input unit, the evidence knowledge non-interactive proof generation unit and the non-interactive proof transmission unit, all of which are included in the proving apparatus, are realized by the proof generation apparatus 425 of the verification apparatus 402.

The common input unit, the random tape input unit, the common input generation unit, the evidence knowledge non-interactive proof generation unit and the non-interactive proof transmission unit, all of which are included in the verification apparatus, are realized by the second relationship proof generation apparatus 417 of the verification apparatus 402. The non-interactive proof reception unit and the determination unit, which are included in the verification apparatus, are realized by the proof verification apparatus 434 of the verification apparatus 402.

According to the present invention, it is possible to perform a deniable zero-knowledge interactive proof if a special honest verifier zero-knowledge interactive proof exists. In particular, the present invention can significantly increase efficiency with respect to amounts of calculations and communication traffic when compared with Related Art 1.

In addition, according to the present invention, highly efficient undeniable signatures, deniable proofs and receipt-free electronic voting can be realized, since it is impossible for any proving apparatus to prove the fact that the proving apparatus has communicated with the verification apparatus.

Moreover, in each of the exemplary embodiments described above, the proving apparatus and the verification apparatus may be realized by computers which operate respective programs.

Although acceptance of a proof is represented by "1" and non-acceptance of a proof by "0" in each of the exemplary embodiments described above, these code assignments may be reversed.

FIRST EXAMPLE

Figure 3:
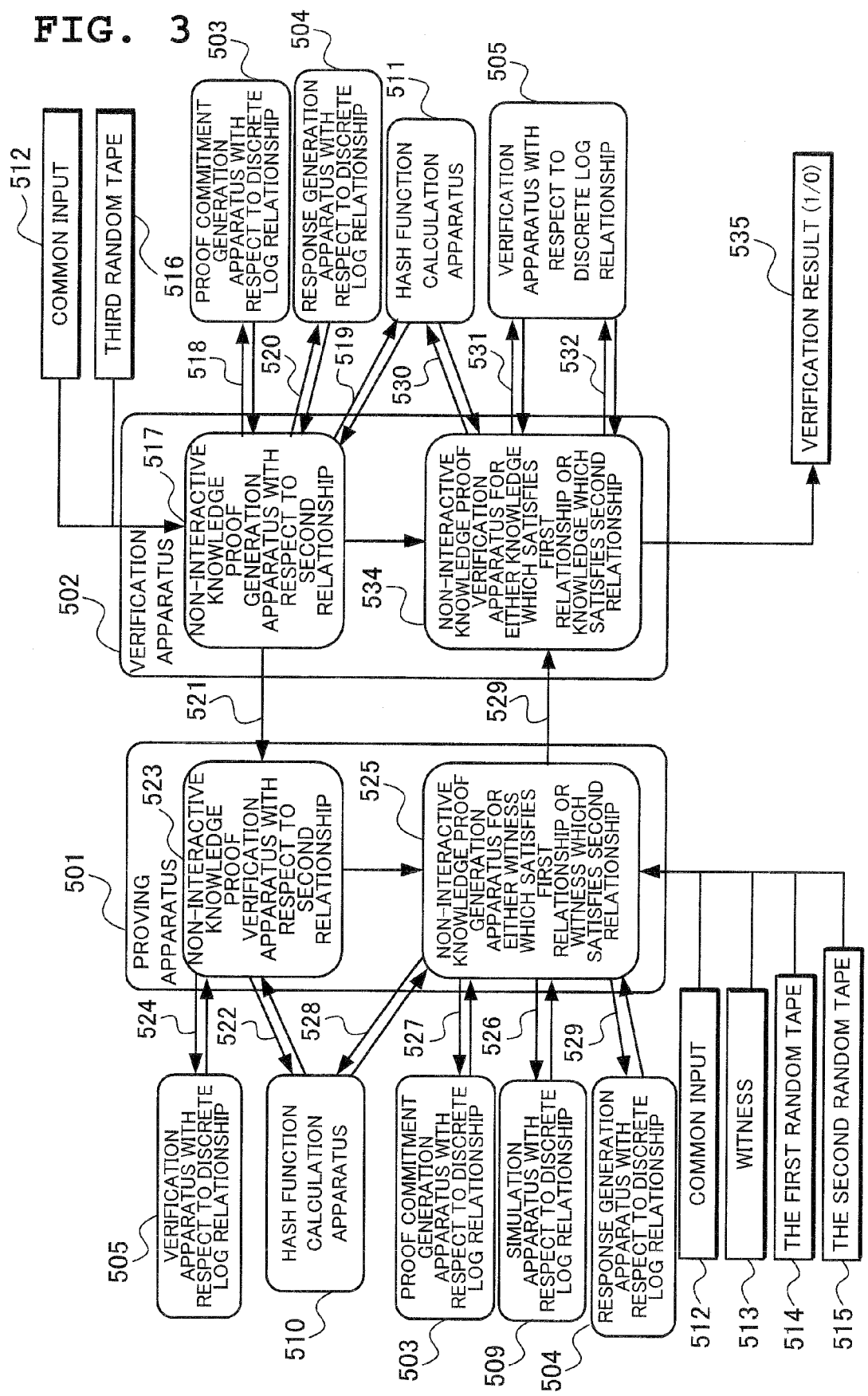
FIG. 3 is an illustrative diagram which shows an example of the invention.

An example of the second exemplary embodiment will be described below. FIG. 3 is an illustrative diagram which shows an example of the second exemplary embodiment of the present invention. In the description of this exemplary embodiment, a case where the same discrete log is used as both a first relationship R and a second relationship R' will be taken as an example. This example is realized based on deniable authentication, wherein the proving apparatus is authenticated by the verification apparatus.

The proving apparatus 501 shown in FIG. 3 corresponds to the proving apparatus 401 of the second exemplary embodiment, and the verification apparatus 502 shown in FIG. 3 corresponds to the verification apparatus 402 of the second exemplary embodiment.

The proving apparatus 501 comprises a proof verification apparatus 523 for a non-interactive knowledge proof with respect to the second relationship (hereinafter, the "second relationship proof verification apparatus 523") and a non-interactive knowledge proof generation apparatus 525 for either a evidence which satisfies the first relationship or a evidence which satisfies the second relationship (hereinafter, the "proof generation apparatus 525"). These apparatuses respectively correspond to the proof verification apparatus 423 and the proof generation apparatus 425 of the second exemplary embodiment.

The verification apparatus 502 comprises a non-interactive knowledge proof generation apparatus 517 with respect to the second relationship (hereinafter, the "second relationship proof generation apparatus 517") and a non-interactive knowledge proof verification apparatus 534 for either knowledge which satisfies the first relationship or knowledge which satisfies the second relationship (hereinafter, the "proof verification apparatus 534"). These apparatuses respectively correspond to the second relationship proof generation apparatus 417 and the proof verification apparatus 434 of the second exemplary embodiment.

The hash function calculation apparatuses 510, 511 shown in FIG. 3 respectively correspond to the hash function calculation apparatuses 410, 411 of the second exemplary embodiment.

In FIG. 3, the common input X is indicated with the code number 512, the evidence W with the code number 513, the first random tape $R_p$ with the code number 514, the second random tape $R'_p$ with the code number 515, and the third random tape $R_V$ and $R'_V$ with the code number 516.

In this example, the same discrete log is used as both the first relationship R and the second relationship R'. Therefore, the first proof commitment generation apparatus 403 and the second proof commitment generation apparatus 406 of the second exemplary embodiment are realized by the same apparatus. This apparatus is the proof commitment generation apparatus 503 shown in FIG. 3 for a proof commitment for a special honest verifier zero-knowledge interactive proof with respect to the discrete log relationship (hereinafter, the "proof commitment generation apparatus 503") The proof commitment generation apparatus 503 generates a proof commitment by using the function $A_R$.

Similarly to the above, this example uses the same apparatus to realize the first response generation apparatus 404 and the second response generation apparatus 407 of the second exemplary embodiment. This apparatus is the response generation apparatus 504 shown in FIG. 3 for a response to a special honest verifier zero-knowledge interactive proof with respect to the discrete log relationship (hereinafter, the "response generation apparatus 504"). The response generation apparatus 504 generates a response by using the function $Z_R$.

Similarly to the above, this example uses the same apparatus to realize the first interactive proof verification apparatus 405 and the second interactive proof verification apparatus 408 of the second exemplary embodiment. This apparatus is the verification apparatus 505 shown in FIG. 3 for a special honest verifier zero-knowledge interactive proof with respect to the discrete log relationship (hereinafter, the "interactive proof verification apparatus 505"). The interactive proof verification apparatus 505 derives a verification result by using the function $V_R$.

The simulation apparatus 509 shown in FIG. 3 for a special honest verifier zero-knowledge interactive proof with respect to the discrete log relationship (hereinafter, the "simulation apparatus 509") corresponds to the second relationship simulation apparatus 409 of the second exemplary embodiment. The simulation apparatus 509 generates a proof commitment and a response by using the function $S_{R'}$.

The functions $A_R$, $Z_R$, $V_R$ and $S_{R'}$ that are used in this exemplary embodiment will be described below. For complementary purposes, the function $E_R$ used in Related Art 2 will also be described below although this function is not used in this example.

(Function $A_R$)

The input of the function $A_R$ are X, W and the random tape $R_p$. The function $A_R$ generates $x' \in Z/qZ$, which is random, from $R_p$ and outputs $a_R$ for $a_R = y' = g^{x'}$.

(Function $Z_R$)

The input of the function $Z_R$ are X, W, the random tape $R_p$, and $e_R = c$. The function $Z_R$ calculates $z_R = r = xc + x'$ mod q and outputs $z_R$.

(Function $V_R$)

The input of the function $V_R$ are X, $a_R$, $e_R$ and $z_R$. The function $V_R$ outputs 1 if $g^r = y^c$ y' holds true; otherwise, it outputs 0.

(Function $S_{R'}$)

The input of the function $S_{R'}$ are X, $e_R = c$ and the random tape $R_S$. The function $S_R$ generates $z_R = r \in Z/qZ$, which is random, from $R_S$ and also generates $a_R = Y' = g^r y^{-c}$. It then outputs $(a_R, z_R)$ (Function $E_R$)

The input of the function $E_R$ are $a_R$, $e_R = c$, $z_R = r$, $e'_R = c'$ and $z'_R = r'$. The function $E_R$ calculates $W = x = (r - r')/(c' - c)$ mod q and outputs W.

Although the random tapes are denoted using $R_S$ and other similar codes in the descriptions of the functions above, these codes are used simply to facilitate the description of the random tapes that are inputted.

The deniable authentication operation of the proving apparatus and the verification apparatus in this example will now be described.

First, the proof generation apparatus 525 of the proving apparatus 501 receives input of a common input X as expressed by (X, W)∈R, a evidence W, the first random tape $R_p$ and the second random tape $R'_p$.

Following this, the second relationship proof generation apparatus 517 of the verification apparatus 502 receives input of the common input X and the third random tape $R_V$ and $R'_V$.

The second relationship proof generation apparatus 517 then outputs a non-interactive knowledge proof $P_R$ for the discrete log relationship, as described below.

Using $R'_V$ within the third random tape, the second relationship proof generation apparatus 517 uniformly and randomly generates X' and W' as expressed by (X', W')∈R'.

Next, the second relationship proof generation apparatus 517 transmits the common input X', the evidence W' and $R_V$ within the third random tape to the proof commitment generation apparatus 503. Using the function $A_R$, the proof commitment generation apparatus 503 generates a proof commitment $\alpha_R$ based on $\alpha_R = A_R(X', W', R_V)$. The proof commitment generation apparatus 503 then transmits the proof commitment $\alpha_R$ to the second proof generation apparatus 517. In FIG. 3, communications that take place in this step are shown as communications 518.

Next, the second relationship proof generation apparatus 517 transmits the common input X' and the proof commitment $\alpha_R$ to the hash function calculation apparatus 511. The hash function calculation apparatus 511 calculates a hash value based on $\epsilon_R$=Hash (X', $\alpha_R$) The hash function calculation apparatus 511 transmits the hash value $\epsilon_R$ to the second relationship proof generation apparatus 517. In FIG. 3, communications that take place in this step are shown as communications 519.

Next, the second relationship proof generation apparatus 517 transmits the common input X', the evidence W', the hash value $\epsilon_R$ and $R_V$ within the third random tape to the response generation apparatus 504, wherein the hash value $\epsilon_R$ is transmitted as a challenge value. Using the function $Z_R$, the response generation apparatus 504 generates a response $\zeta_R$ based on $\zeta_R=Z_R$(X', W', $\epsilon_R$, $R_V$) The response generation apparatus 504 then transmits the response $\zeta R$ to the second relationship proof generation apparatus 517. In FIG. 3, communications that take place in this step are shown as communications 520.

The second relationship proof generation apparatus 517 assumes that a non-interactive knowledge proof $P_R$ for the discrete log relationship is (X', $\epsilon_R$, $\zeta_R$) The second relationship proof generation apparatus 517 transmits the proof $P_R$=(X', $\epsilon_R$, $\zeta_R$) generated as described above to the second relationship proof verification apparatus 523 (communication 521 in FIG. 3).

The second relationship proof verification apparatus 523 waits for the proof $P_R$ to be transmitted, and receives the proof $P_R$=(X', $\epsilon_R$, $\zeta_R$) from the second relationship proof generation apparatus 517 through the communication 521 above.

The second relationship proof verification apparatus 523 of the proving apparatus 501 verifies the non-interactive knowledge proof $P_R$ for the discrete log, as described below.

The second relationship proof verification apparatus 523 transmits the common input X' and the proof commitment $\alpha_R$ to the hash function calculation apparatus 510. The hash function calculation apparatus 510 calculates a hash value based on $\epsilon'_R$=Hash(X', $\alpha_R$) The hash function calculation apparatus 510 transmits the hash value $\epsilon'_R$ to the second relationship proof verification apparatus 523. In FIG. 3, communications that take place in this step are shown as communications 522.

The second relationship proof verification apparatus 523 transmits the common input X', the proof commitment $\alpha_R$, the hash value $\epsilon'_R$ and the response $\zeta R$ to the interactive proof verification apparatus 505, wherein the hash value $\epsilon'_R$ is transmitted as a challenge value. The interactive proof verification apparatus 505 derives a calculation result for $V_R$(X', $\alpha_R$, $\epsilon'_R$, $\zeta_R$) by using the function $V_R$, and transmits the calculation result to the second relationship proof verification apparatus 523. In FIG. 3, communications that take place in this step are shown as communications 524.

The second relationship proof verification apparatus 523 determines whether or not $V_R$(X', $\alpha_R$, $\epsilon'_R$, $\zeta_R$)=1 holds true. If it does not hold true, the second relationship proof verification apparatus 523 stops the proving apparatus 501. If it holds true, the proving apparatus 501 performs the following operation. That is, if $V_R$(X', $\alpha_R$, $\epsilon'_R$, $\zeta_R$)=1 holds true, the proving apparatus 501 decides acceptance of the proof $P_R$; otherwise, it decides non-acceptance of the proof $P_R$.

The proof generation apparatus 525 of the proving apparatus 501 generates a non-interactive knowledge proof $P_R(X) \vee R(X')$ for either an evidence which satisfies the discrete log relationship with respect to X or an evidence which satisfies the discrete log relationship with respect to X', in the following manner.

Using the second random tape $R'_p$, the proof generation apparatus 525 generates a random number $e'_R$ and sets it as a challenge value.

Next, the proof generation apparatus 525 transmits the common input X', the challenge value $e'_R$ and the second random tape R'P to the simulation apparatus 509, and causes the simulation apparatus 509 to generate a proof commitment $a'_R$ and a response $z'_R$. The simulation apparatus 509 derives $(a'_R, z'_R)=S_R(X', e'_R, R'_p)$ by using the function $S_R$, and transmits the proof commitment $a'_R$ and the response $z'_R$ to the proof generation apparatus 525. In FIG. 3, communications that take place in this step are shown as communications 526.

The proof generation apparatus 525 then transmits the common input X, the evidence W and the first random tape $R_p$ to the proof commitment generation apparatus 503. The proof commitment generation apparatus 503 generates a proof commitment $a_R$ by using the function $A_R$, based on $a_R=A_R$(X, W, $R_p$), and transmits it to the proof generation apparatus 525. In FIG. 3, communications that take place in this step are shown as communications 527.

The proof generation apparatus 525 then transmits the common input X, the proof commitment $a_R$, the common input X' and the proof commitment $a'_R$ to the hash function calculation apparatus 510. The hash function calculation apparatus 510 calculates a hash value e based on e=Hash(X, $a_R$, X', $a'_R$), and transmits the resultant hash value to the proof generation apparatus 525. In FIG. 3, communications that take place in this step are shown as communications 528.

Next, the proof generation apparatus 525 calculates a challenge value $e_R$ based on $e_R=e \vee e'_R$. The proof generation apparatus 525 transmits the common input X, the evidence W, the challenge value $e_R$ and the first random tape $R_p$ to the response generation apparatus 504, and causes the response generation apparatus 504 to generate a response $z_R$. The response generation apparatus 504 generates a response $z_R$ by using the function $Z_R$, based on $z_R=Z_R$(X, W, $e_R$, $R_p$), and transmits the response $z_R$ to the proof generation apparatus 525. In FIG. 3, communications that take place in this step are shown as communications 529.

The proof generation apparatus 525 sets a non-interactive knowledge proof $P_R(X) \vee R(X')$ for either an evidence which satisfies the discrete log relationship with respect to X or an evidence which satisfies the discrete log relationship with respect to X', as ($a_R$, $e_R$, $z_R$, $a'_R$, $e'_R$, $z'_R$) The proof generation apparatus 525 transmits the proof $P_R(X) \vee R(X') = (a_R, e_R, z_R, a'_R, e'_R, z'_R)$ generated as described above to the proof verification apparatus 534 of the verification apparatus 502 (communication 529 in FIG. 3).

The proof verification apparatus 534 transmits the common input X, the proof commitment $a_R$, the common input X' and the proof commitment $a'_R$ to the hash function calculation apparatus 511, and causes the hash function calculation apparatus 511 to calculate a hash value. The hash function calculation apparatus 511 derives a calculation result for Hash(X, $a_R$, X', $a'_R$) and transmits the calculation result (hash value) to the proof verification apparatus 534. In FIG. 3, communications that take place in this step are shown as communications 530. The proof verification apparatus 534 then determines whether or not the calculation result for Hash(X, $a_R$, X', $a'_R$) is equal to $e_R \vee e'_R$.

The proof verification apparatus 534 then transmits the common input X, the proof commitment $a_R$, the challenge value $e_R$ and the response $z_R$ to the interactive proof verification apparatus 505. The interactive proof verification apparatus 505 derives a calculation result for $V_R(X, a_R, e_R, z_R)$ by using the function $V_R$, and transmits the calculation result to the proof verification apparatus 534. In FIG. 3, communications that take place in this step are shown as communications 532. The proof verification apparatus 534 determines whether or not $V_R(X, a_R, e_R, z_R)=1$ holds true.

Next, the proof verification apparatus 534 transmits the common input X', the proof commitment $a'_R$, the challenge value $e'_R$ and the response $z'_R$ to the interactive proof verification apparatus 505. The interactive proof verification apparatus 505 derives a calculation result for $V_R(X', a'_R, e'_R, z'_R)$ by using the function $V_R$, and transmits the calculation result to the proof verification apparatus 534. In FIG. 3, communications that take place in this step are shown as communications 531. The proof verification apparatus 534 determines whether or not $V_R(X', a'_R, e'_R, z'_R)=1$ holds true.

If all the determinations above hold true, i.e., all of $Hash(X, a_R, X', a'_R)=e_R \vee e'_R$, $V_R(X, a_R, e_R, z_R)=1$ and $V_R(X', a'_R, e'_R, z'_R)=1$ hold true, the proof verification apparatus 534 outputs "1" as a verification result 535; otherwise the proof verification apparatus 534 outputs "0" as a verification result 535, wherein "1" indicates acceptance of the proof $P_R(X) \vee R(X')$ and "0" indicates non-acceptance of the proof $P_R(X) \vee R(X')$.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

INCORPORATION BY REFERENCE

This application is based upon and claims the benefit of priority from Japanese patent application No. 2005-233636, filed on Aug. 11, 2005, the disclosure of which is incorporated herein in its entirety by reference.

INDUSTRIAL APPLICABILITY

The present invention can be applied to, for example, repudiation protocols for undeniable signatures, verification protocols for undeniable signatures and deniable zero-knowledge interactive proofs that are used for deniable authentication, etc.

The present invention can also be applied to deniable authentication by hardware with low calculation power, such as smart cards. When performing authentication with high privacy protection, such as a deniable proof based on a related method, on a smart card or other similar means, it used to take an enormous amount of time due to low calculation power of the smart card or other similar means. By applying the present invention, it becomes possible to realize authentication with high privacy protection with at most around two times as large as the amount of calculations that is required in authentication with low privacy protection.

The present invention can also be applied to a server or other similar device which performs authentication with high privacy protection. Generally speaking, when a server or other similar device handles a large amount of authentication attempts, the processing amount becomes extremely large even though the amounts of time and communication traffic required for each authentication attempt are small. In such a situation, the present invention can reduce the amounts of calculations and communications by the server to low levels while performing authentication with high privacy protection.

The present invention can also be applied to cases where zero-knowledge proofs with high privacy protection are performed. There are many applications in which high privacy protection is desirable, examples of which including authentication, electronic voting, undeniable signatures and designated confirmer signatures. Many types of special honest verifier zero-knowledge interactive proof that support these applications have been proposed. By applying the present invention to these special honest verifier zero-knowledge interactive proofs, one can easily realize authentication, electronic voting, undeniable signatures, designated confirmer signatures, etc., with high privacy protection.

The invention claimed is:

1. A proving apparatus communicably connected to a verification apparatus, comprising:

said proving apparatus being communicably connected with a proof commitment generation apparatus which generates a proof commitment for a special honest verifier zero-knowledge interactive proof with respect to a predetermined relationship, based on a common input, an evidence and a random tape which respectively satisfy said predetermined relationship;

said proving apparatus being communicably connected with a response generation apparatus which generates a response to the special honest verifier zero-knowledge interactive proof with respect to said relationship, based on the common input, the evidence, the random tape and a challenge value; wherein said proving apparatus comprising:

a microprocessor; and a memory;

wherein said microprocessor programmed to execute:

a common input unit into which the common input and the evidence which respectively satisfy said relationship are inputted;

a random tape input unit into which the random tape is inputted;

a challenge value commitment reception unit which receives a commitment of the challenge value from said verification apparatus;

a proof commitment generation control unit which, on the reception of a commitment of the challenge value by said challenge value commitment reception unit, transmits the common input, the evidence and the random tape to said proof commitment generation apparatus to cause said proof commitment generation apparatus to generate the proof commitment and transmits the proof commitment to said verification apparatus;

a challenge value reception unit which receives from said verification apparatus the challenge value and a random number which serves as an evidence for the commitment of the challenge value;

a challenge value commitment verification unit which, on the reception of the challenge value and the random number by said challenge value reception unit, verifies whether or not the commitment of the challenge value received by said challenge value commitment reception unit is the commitment of the challenge value received by said challenge value reception unit, a response generation control unit which, if it has been determined that the commitment of the challenge value received by said challenge value commitment reception unit is the commitment of the challenge value received by said challenge value reception unit, transmits the common input, the evidence, the random tape and the challenge value to said response generation apparatus to cause said response generation apparatus to generate a response and transmits the resultant response to said verification apparatus.

2. The verification apparatus which is communicably connected with the proving apparatus of claim 1, wherein said verification apparatus being communicably connected with an interactive proof verification apparatus which outputs a signal indicating acceptance or non-acceptance of the special honest verifier zero-knowledge interactive proof with respect to a pre-determined relationship, based on the common input, the proof commitment, the challenge value and the response;
said verification apparatus being communicably connected with a hash function calculation apparatus which calculates a hash function; and
wherein said processor further executes the common input unit into which the common input is inputted;
the random tape input unit into which the random tape is inputted;
a challenge value generation unit which generates challenge value by using a random tape;
a random number generation unit which generates a random number by using a random tape;
a challenge value commitment generation control unit which transmits said challenge value and said random number to said hash function calculation apparatus to cause said hash function calculation apparatus to calculate a hash value according to said challenge value and said random number and transmits to said proving apparatus the resultant hash value as the commitment of the challenge value;
a proof commitment reception unit which receives a proof commitment from said proving apparatus;
a response reception unit which receives a response from said proving apparatus; and
a verification result output unit which transmits to said interactive proof verification apparatus the common input, the proof commitment, the challenge value and the response, receives from the interactive proof verification apparatus a signal indicating acceptance or non-acceptance of a special honest verifier zero-knowledge interactive proof, and outputs the received signal as a verification result.

3. A proving apparatus communicably connected with a verification apparatus, comprising: said proving apparatus being communicably connected with a first proof commitment generation apparatus which generates a proof commitment for a special honest verifier zero-knowledge interactive proof with respect to a pre-determined first relationship, based on a common input, an evidence and a random tape which respectively satisfy the pre-determined first relationship;
said proving apparatus being communicably connected with a first response generation apparatus which generates a response to a special honest verifier zero-knowledge interactive proof with respect to the pre-determined first relationship, based on the common input, the evidence, the random tape and a challenge value all with respect to the pre-determined first relationship;
said proving apparatus being communicably connected with a second interactive proof verification apparatus which outputs a signal indicating acceptance or non-acceptance of a special honest verifier zero-knowledge interactive proof with respect to a second relationship, based on a common input, a proof commitment, a challenge value and a response all with respect to the second relationship;
said proving apparatus being communicably connected with a simulation apparatus which generates the proof commitment and the response with respect to the second relationship, based on the common input, the challenge value and a random tape all with respect to the second relationship:
being communicably connected with a hash function calculation apparatus which calculates a hash function;
said proving apparatus comprising:
a microprocessor; and
a memory;
wherein said microprocessor is programmed to execute:
a common input reception unit into which the common input and the evidence that respectively satisfy the pre-determined first relationship are inputted;
a random tape input unit into which the first random tape and the second random tape are inputted;
a non-interactive proof reception unit which receives from said verification apparatus the common input with respect to the second relationship and a non-interactive knowledge proof for an evidence that corresponds to the common input of the second relationship;
a non-interactive proof acceptance/non-acceptance determination unit which determines whether to accept or not accept said non-interactive proof, based on the result of communicating with said hash function calculation apparatus and said second interactive proof verification apparatus by using said non-interactive proof;
an evidence knowledge non-interactive proof generation unit which generates a non-interactive proof that proves knowledge of either the evidence for the common input with respect to the pre-determined first relationship or the evidence for the common input with respect to the second relationship, by communicating with said simulation apparatus, said first proof commitment generation apparatus, said hash function calculation apparatus and the first response generation apparatus and by using during the communications the first random tape, the second random tape, the common input and the evidence that respectively satisfy the pre-determined first relationship and the common input that is contained in said non-interactive proof; and
a non-interactive proof transmission unit which transmits the non-interactive knowledge proof generated by said evidence knowledge non-interactive proof generation unit to said verification apparatus.

4. The proving apparatus of claim 3, wherein said non-interactive proof reception unit receives from the verification apparatus the non-interactive proof which contains the common input, the proof commitment and the response all with respect to the second relationship;
said non-interactive proof acceptance/non-acceptance determination unit transmits to the hash function calculation apparatus the common input and the proof commitment both with respect to the second relationship that are contained in said non-interactive proof, and causes the hash function calculation apparatus to calculate a hash value which serves as a challenge value according to the common input and the proof commitment with respect to said second relationship, and
transmits to the second interactive proof verification apparatus said challenge value, the common input and the proof commitment all with respect to the second relationship that are contained in said non-interactive proof, and the response, and determines whether to accept or not to accept said non-interactive proof depending on the signal outputted by the second interactive proof verification apparatus;

said evidence knowledge non-interactive proof generation unit generates a challenge value with respect to the second relationship by using the second random tape, transmits to the simulation apparatus the common input with respect to said second relationship, the challenge value with respect to said second relationship and the second random tape, and causes the simulation apparatus to generate a proof commitment and response with respect to the second relationship, transmits to the first proof commitment generation apparatus the common input and the evidence that respectively satisfy the pre-determined first relationship and the first random tape, and causes the first proof commitment generation apparatus to generate a proof commitment with respect to the pre-determined first relationship, transmits to said hash function calculation apparatus the common input and the proof commitment with respect to the pre-determined first relationship, the common input with respect to the second relationship, and the proof commitment with respect to the second relationship that has been generated by the simulation apparatus, and causes said hash function calculation apparatus to calculate a hash value corresponding to the common input and the proof commitment with respect to the pre-determined first relationship and the common input and the proof commitment with respect to the second relationship, determines a challenge value with respect to the pre-determined first relationship, based on the hash value and the challenge value with respect to said second relationship, transmits to the first response generation apparatus the common input and the evidence that respectively satisfy the pre-determined first relationship, the first random tape and the challenge value with respect to said pre-determined first relationship, and causes the first response generation apparatus to generate a response with respect to the pre-determined first relationship, and uses, as a non-interactive knowledge proof, the proof commitment, the challenge value and the response all with respect to the pre-determined first relationship, the challenge value with respect to the second relationship, and the proof commitment and the response, both with respect to the second relationship, that have been generated by the simulation apparatus.

5. The verification apparatus communicably connected with the proving apparatus of claim 3, said verification apparatus being communicably connected with a first interactive proof verification apparatus which outputs the signal indicating acceptance or non-acceptance of the special honest verifier zero-knowledge interactive proof with respect to the pre-determined first relationship, based on the common input, the proof commitment, the challenge value and the response all with respect to the pre-determined first relationship;

said verification apparatus being communicably connected with a second interactive proof verification apparatus which outputs a signal indicating acceptance or non-acceptance of a special honest verifier zero-knowledge interactive proof with respect to the second relationship, based on a common input, the proof commitment, the challenge value and the response all with respect to the second relationship;

said verification apparatus being communicably connected with a second proof commitment generation apparatus which generates a proof commitment of the special honest verifier zero-knowledge interactive proof with respect to the second relationship, based on the common input, the evidence and the random tape all with respect to the second relationship:

said verification apparatus being communicably connected with a second response generation apparatus which generates a response to the special honest verifier zero-knowledge interactive proof with respect to the second relationship, based on the common input, the evidence, the random tape and the challenge value all with respect to the second relationship:

said verification apparatus being communicably connected with a hash function calculation apparatus which calculates a hash function; wherein said processor executes a common input unit into which the common input with respect to the pre-determined first relationship is inputted;

a random tape input unit into which a random tape $R_V$ and a random tape $R'_V$ are inputted as a third random tape;

a common input generation unit which generates a common input and an evidence that satisfy the second relationship from the random tape $R'_V$ within the third random tape;

an evidence knowledge non-interactive proof generation unit which generates a non-interactive knowledge proof that can satisfy the second relationship between a common input, by communicating with said second proof commitment generation apparatus, said second response generation apparatus and said hash function calculation apparatus and by using said common input and an evidence that have been generated by said common input generation unit and that respectively satisfy the second relationship, and the random tape $R_V$ within the third random tape;

a non-interactive proof transmission unit which transmits to the proving apparatus a non-interactive knowledge proof generated by said evidence knowledge non-interactive proof generation unit;

a non-interactive proof reception unit which receives from the proving apparatus a non-interactive knowledge proof that proves knowledge of either the evidence for the common input with respect to the pre-determined first relationship or the evidence for the common input with respect to the second relationship; and a determination unit which determines whether to accept or not accept the non-interactive proof received by the non-interactive proof reception unit, by communicating with said first interactive proof verification apparatus, said second interactive proof verification apparatus and said hash function calculation apparatus by using the common input with respect to the second relationship, the common input with respect to the pre-determined first relationship that has been inputted into the common input unit, and the non-interactive proof received by the non-interactive proof reception unit, and which outputs the determination result thus obtained.

6. The verification apparatus of claim 5, wherein said evidence knowledge non-interactive proof generation unit transmits to the second proof commitment generation apparatus the common input and the evidence that respectively satisfy the second relationship and the random tape $R_V$ within the third random tape, and causes the second proof commitment generation apparatus to generate a proof commitment with respect to the second relationship, transmits to the hash function calculation apparatus the common input with respect to the second relationship and the proof commitment both with respect to said second relationship, and causes the hash function calculation apparatus to calculate a hash value which serves as a challenge value according to said common input and said proof commitment, and transmits to the second response generation apparatus the common input and the evidence that respectively satisfy the second relationship, said random tape $R_V$ and said challenge value, and causes the second response generation apparatus to generate a response with respect to the second relationship, and setting the common input and the proof commitment both with respect to the second relationship and the response as a non-interactive knowledge proof;

said non-interactive proof reception unit:

receives from the proving apparatus a non-interactive proof which contains the proof commitment, the challenge value and the response with respect to the pre-determined first relationship and the proof commitment, the challenge value and the response with respect to the second relationship;

said determination unit:

transmits to the pre-determined first interactive proof verification apparatus the common input with respect to the pre-determined first relationship which has been inputted into the common input unit, as well as the proof commitment, the challenge value and the response with respect to the pre-determined first relationship which are contained in the non-interactive proof, and receives a signal outputted by the pre-determined first interactive proof verification apparatus, transmits to the second interactive proof verification apparatus the common input with respect to the second relationship, as well as the proof commitment, the challenge value and the response with respect to the second relationship which are contained in the non-interactive proof, and receives a signal outputted by the second interactive proof verification apparatus, transmits to the hash function calculation apparatus the common input and the proof commitment with respect to the pre-determined first relationship and the common input and the proof commitment with respect to the second relationship to cause the hash function calculation apparatus to calculate hash values that correspond to the common input and the proof commitment with respect to the pre-determined first relationship and the common input and the proof commitment with respect to the second relationship, and determines whether or not a required relationship holds between one of these hash values and the challenge value with respect to the first relationship that is contained in the non-interactive proof and between the other hash value and the challenge value with respect to the second relationship, and determines whether to accept or not accept the non-interactive proof, based on the result of determination and the signals received from the first interactive proof verification apparatus and the second interactive proof verification apparatus.

7. The verification apparatus communicably connected with the proving apparatus of claim 4, said verification apparatus being communicably connected with a first interactive proof verification apparatus which outputs a signal indicating acceptance or non-acceptance of a special honest verifier zero-knowledge interactive proof with respect to the pre-determined first relationship, based on the common input, the proof commitment, the challenge value and the response all with respect to the pre-determined first relationship;

said verification apparatus being communicably connected with a second interactive proof verification apparatus which outputs a signal indicating acceptance or non-acceptance of a special honest verifier zero-knowledge interactive proof with respect to the second relationship, based on the common input, the proof commitment, the challenge value and the response all with respect to the second relationship;

said verification apparatus being communicably connected with a second proof commitment generation apparatus which generates a proof commitment of a special honest verifier zero-knowledge interactive proof with respect to the second relationship, based on a common input, an evidence and a random tape all with respect to the second relationship:

said verification apparatus being communicably connected with a second response generation apparatus which generates a response to a special honest verifier zero-knowledge interactive proof with respect to the second relationship, based on the common input, the evidence, the random tape and the challenge value all with respect to the second relationship:

said verification apparatus being communicably connected with a hash function calculation apparatus which calculates a hash function;

wherein said processor executes:

the common input unit into which a common input with respect to the pre-determined first relationship is inputted;

a random tape input unit into which a random tape $R_V$ and a random tape $R'_V$ are inputted as a third random tape;

the common input generation unit which generates the common input and an evidence that satisfy the second relationship from the random tape $R'_V$ within the third random tape;

an evidence knowledge non-interactive proof generation unit which generates a non-interactive knowledge proof that can satisfy the second relationship between the common input, by communicating with said second proof commitment generation apparatus, said second response generation apparatus and said hash function calculation apparatus and by using said common input and an evidence that have been generated by said common input generation unit and that respectively satisfy the second relationship, and the random tape $R_V$ within the third random tape;

a non-interactive proof transmission unit which transmits to the proving apparatus a non-interactive knowledge proof generated by said evidence knowledge non-interactive proof generation unit;

a non-interactive proof reception unit which receives from the proving apparatus a non-interactive proof that proves knowledge of either the evidence for the common input with respect to the pre-determined first relationship or the evidence for the common input with respect to the second relationship; and a determination unit which determines whether to accept or not accept the non-interactive proof received by the non-interactive proof reception unit, by communicating with said first interactive proof verification apparatus, said second interactive proof verification apparatus and said hash function calculation apparatus by using the common input with respect to the second relationship, the common input with respect to the pre-determined first relationship that has been inputted into the common input unit, and the non-interactive proof received by the non-interactive proof reception unit, and which outputs the determination result thus obtained.

* * * * *